United States Patent
Mola

(10) Patent No.: US 11,042,469 B2
(45) Date of Patent: Jun. 22, 2021

(54) LOGGING TRACE DATA FOR PROGRAM CODE EXECUTION AT AN INSTRUCTION LEVEL

(71) Applicant: Microsoft Technology Licensing, LLC, Redmond, WA (US)

(72) Inventor: Jordi Mola, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/581,135

(22) Filed: Sep. 24, 2019

(65) Prior Publication Data

US 2020/0026639 A1    Jan. 23, 2020

Related U.S. Application Data

(63) Continuation-in-part of application No. 15/688,828, filed on Aug. 28, 2017, now Pat. No. 10,445,211.

(51) Int. Cl.
*G06F 11/36* (2006.01)
*G06F 11/34* (2006.01)

(52) U.S. Cl.
CPC ...... *G06F 11/3636* (2013.01); *G06F 11/3476* (2013.01); *G06F 2201/865* (2013.01)

(58) Field of Classification Search
CPC ............. G06F 11/3636; G06F 11/3476; G06F 2201/865
See application file for complete search history.

(56) References Cited

U.S. PATENT DOCUMENTS

| | | | | |
|---|---|---|---|---|
| 5,944,841 A * | 8/1999 | Christie | .............. | G06F 11/3636 714/38.11 |
| 5,978,902 A * | 11/1999 | Mann | .................... | G06F 11/348 712/227 |
| 6,463,553 B1 * | 10/2002 | Edwards | ............. | G06F 11/3636 714/31 |
| 7,793,261 B1 * | 9/2010 | Edwards | ............. | G06F 11/3636 717/124 |
| 9,195,524 B1 * | 11/2015 | Wiesner | .............. | G06F 11/3648 |
| 9,384,109 B2 * | 7/2016 | Bhatia | .................. | G06F 11/3664 |
| 9,626,275 B1 * | 4/2017 | Hitchcock | ........... | G06F 11/3093 |
| 2005/0027783 A1 * | 2/2005 | Green | ................. | G06F 11/3636 709/200 |

(Continued)

OTHER PUBLICATIONS

"International Search Report and Written Opinion Issued in PCT Application No. PCT/US20/038264", dated Dec. 18, 2020, 15 Pages.

*Primary Examiner* — Douglas M Slachta
(74) *Attorney, Agent, or Firm* — Workman Nydegger

(57) ABSTRACT

Methods and systems are disclosed for logging trace data generated by executing program code at an instruction level. In aspects, high volumes of trace data are generated during certain time periods, e.g., immediately following a start of the tracing. Processors operating at normal speeds are often unable to log such high volumes of trace data. The issue of such high volumes of trace data may be addressed by selectively and dynamically controlling logging of outstanding trace data. For example, a rate of generating the trace may be reduced by slowing processor speeds, logging of outstanding trace data may be suspended for a period, and logging of non-urgent trace data may be selectively delayed.

17 Claims, 15 Drawing Sheets

(56) References Cited

U.S. PATENT DOCUMENTS

| | | | |
|---|---|---|---|
| 2007/0074081 A1* | 3/2007 | DeWitt, Jr. | G06F 11/3466 714/45 |
| 2007/0261032 A1* | 11/2007 | Chen | G06F 11/348 717/130 |
| 2008/0235538 A1* | 9/2008 | Horley | G06F 11/3466 714/47.1 |
| 2011/0067008 A1* | 3/2011 | Srivastava | G06F 11/3636 717/128 |
| 2012/0016853 A1* | 1/2012 | Wang | G06F 9/3834 707/703 |
| 2012/0226839 A1* | 9/2012 | Fuoco | G06F 11/348 710/110 |
| 2013/0060730 A1* | 3/2013 | Bailey, Jr. | G06F 11/3476 707/609 |
| 2015/0074636 A1* | 3/2015 | Diewald | G06F 8/30 717/106 |
| 2017/0052876 A1* | 2/2017 | Svensson | G06F 11/3461 |
| 2018/0004526 A1* | 1/2018 | Lyra | G06F 11/36 |
| 2018/0349143 A1* | 12/2018 | Park | G06F 9/3836 |
| 2019/0266086 A1 | 8/2019 | Mola et al. | |
| 2019/0266090 A1 | 8/2019 | Mola | |

\* cited by examiner

LOGGING TRACE DATA FOR PROGRAM CODE EXECUTION AT AN INSTRUCTION LEVEL

CROSS-REFERENCE TO RELATED APPLICATION

This application is a continuation in part of U.S. application Ser. No. 15/688,828, entitled "LOGGING TRACE DATA FOR PROGRAM CODE EXECUTION AT AN INSTRUCTION LEVEL," which was filed on Aug. 28, 2017, which issued on Oct. 15, 2019 as U.S. Pat. No. 10,445,211 the entire contents of which are incorporated by reference herein in their entirety.

BACKGROUND

Debugging procedures are conducted during both development and post-deployment analysis of computer programs, so as to find and resolve issues and to provide computer systems and devices with expected features. Debugger applications may be useful for debugging program code by evaluating a log of memory locations and data values (collectively, "trace data") generated and logged in an environment in which the program code is executed. For example, the trace data may be generated during code execution and then logged by processors of computing systems. Thereafter, the logged trace data may be analyzed by a debugger to identify issues that occurred during execution of the program code.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by executing one or more of processing to control tracing of information related to executing program code. For instance, speeds of one or more processors may be adjusted to slow down (e.g., throttle) or stall processing when an amount of trace data requiring immediate logging becomes excessively high. In another instance, tracing of information may be suspended while a rate of generating trace data is higher than a threshold rate. In yet another instance, logging of trace data may be postponed in ways without compromising integrity of the trace data.

In aspects, a computer-implemented method for logging trace data generated by executing program code at an instruction level is provided. The method includes receiving an indication of access to a cache line and determining whether trace data generated for the cache line is one of urgent and non-urgent. When the trace data is urgent the method further includes logging the urgent trace data, retrieving non-urgent trace data associated with one or more other cache lines, and logging the non-urgent trace data associated with the one or more other cache lines based at least in part on available processing resources.

In further aspects, a computing device including at least one processing unit and at least one memory is provided. The memory stores computer-executable instructions for logging trace data generated by executing program code at an instruction level. Execution of the instruction by at least one processing unit causes the computer device to receive a number of outstanding trace data to be logged, and compare the number of outstanding trace data to be logged with at least one threshold. Based on the comparison, trace data is selectively processed, the selective processing comprising one or more steps selected from the list consisting of: changing a rate of generating the trace data by slowing processor speed, suspending logging of the trace data for a period of time, and selectively delaying logging of at least some of the outstanding trace data.

In still further aspects, a computer storage medium is provided. The computer storage medium stores computer-executable instructions for logging trace data generated by executing program code at an instruction level. When executed by at least one processing unit, the computer-executable instructions cause the at least one processing unit to receive an indication of access to a cache line, determine whether trace data generated for the cache line is one of urgent and non-urgent. When the trace data is urgent, the computer-executable instruction further causes the at least processing unit to log the urgent trace data to retrieve non-urgent trace data associated with one or more other cache lines, and log the non-urgent trace data associated with the one or more other cache lines based at least in part on available processing resources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
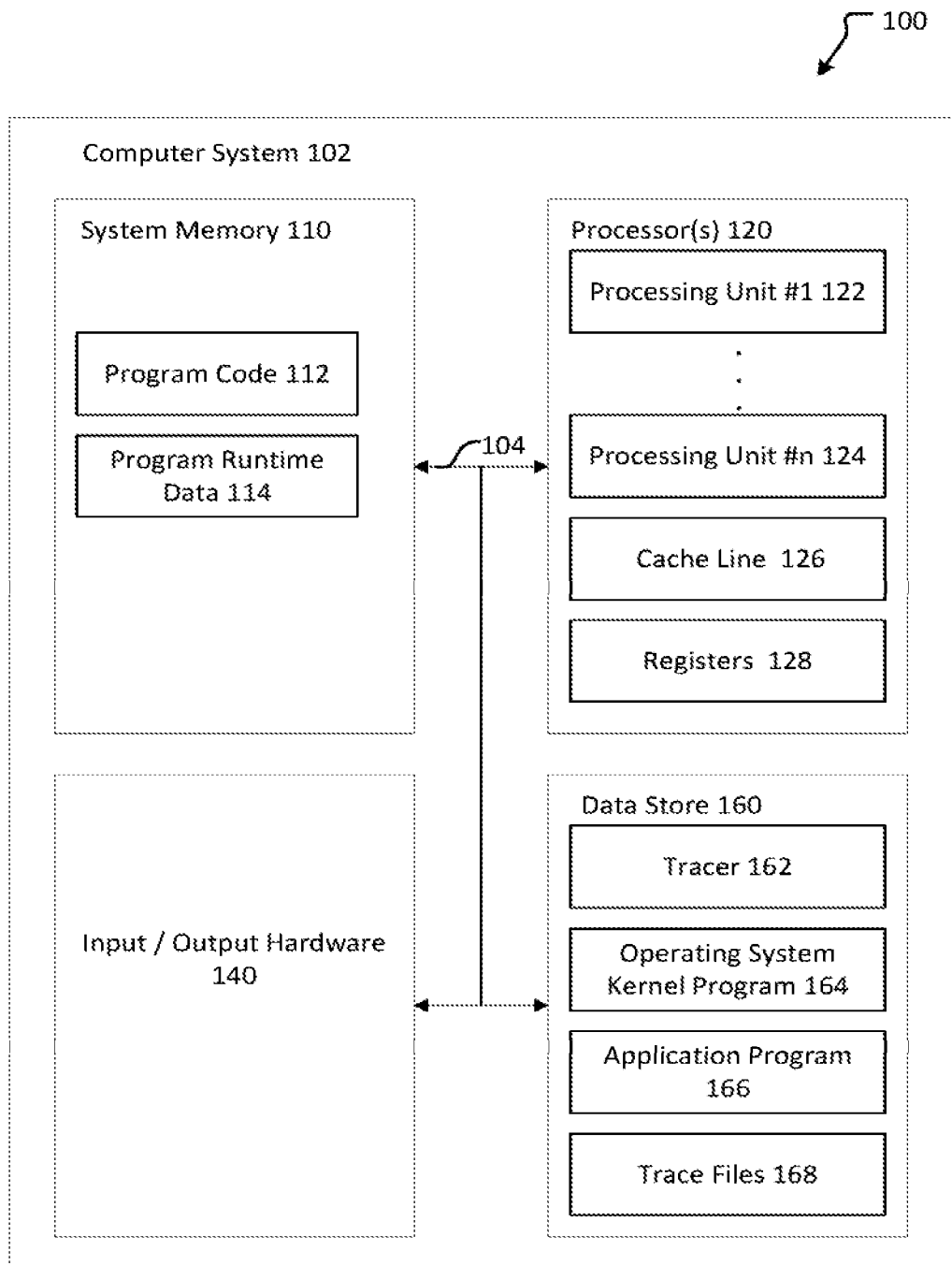
FIG. 1 illustrates an overview of an example system for logging trace data at an instruction level.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for logging trace data during execution of program code at an instruction level. In aspects, target computer systems and/or devices may execute application program code while a debugger application monitors the application program code. The debugger application may start and stop the program execution based on settings associated with break points and exceptions occurring during the execution. In particular the debugger may log trace data as the processor executes application program code. For instance, trace data may include but is not limited to the contents of one or more cache lines, registers, etc., within main memory, as well as the contents of the program code themselves.

In aspects, a rate of generating trace data at the target computing system may vary at different times during execution. For instance, a thread of executing program code may generate trace data at a general or average rate of about a half a bit (½ bit) per instruction. This rate may translate into about several gigabits per second depending on processor speeds. However, the specific rate of generating trace data may vary during different phases of execution of the program code. In particular, the rate may be higher than the average rate of half a bit (½ bit) per instruction at the beginning of tracing or after a key frame. A key frame is defined as the first frame of a set of frames upon which differencing is determined (e.g., pixel changes or deltas) for the remainder of the set of frames. A key frame may occur upon a context switch, such as but not limited to switching between threads and switching between processes in program code execution. In some cases, a rate of generating trace data for a program code may correspond to processor speed. For instance, a processor with a higher processing speed may process more instructions of the program code than a processor with a lower processing speed may process during a given time period. Since the rate of generating trace data is based on instructions being processed during a given time period, the rate of generating trace data may be greater when the processor speed is higher. However, in other cases, the rate of generating trace data may not correspond to processor speed. For instance, a processor with a higher processing speed may process the same number of instructions of the program code during a given time period as a processor with a lower processing speed if the higher-speed processor is concurrently processing instructions of other program code. In other cases, local trace data size may depend on code and data locality, where having a higher locality may render a smaller size of trace data.

Figure 4:
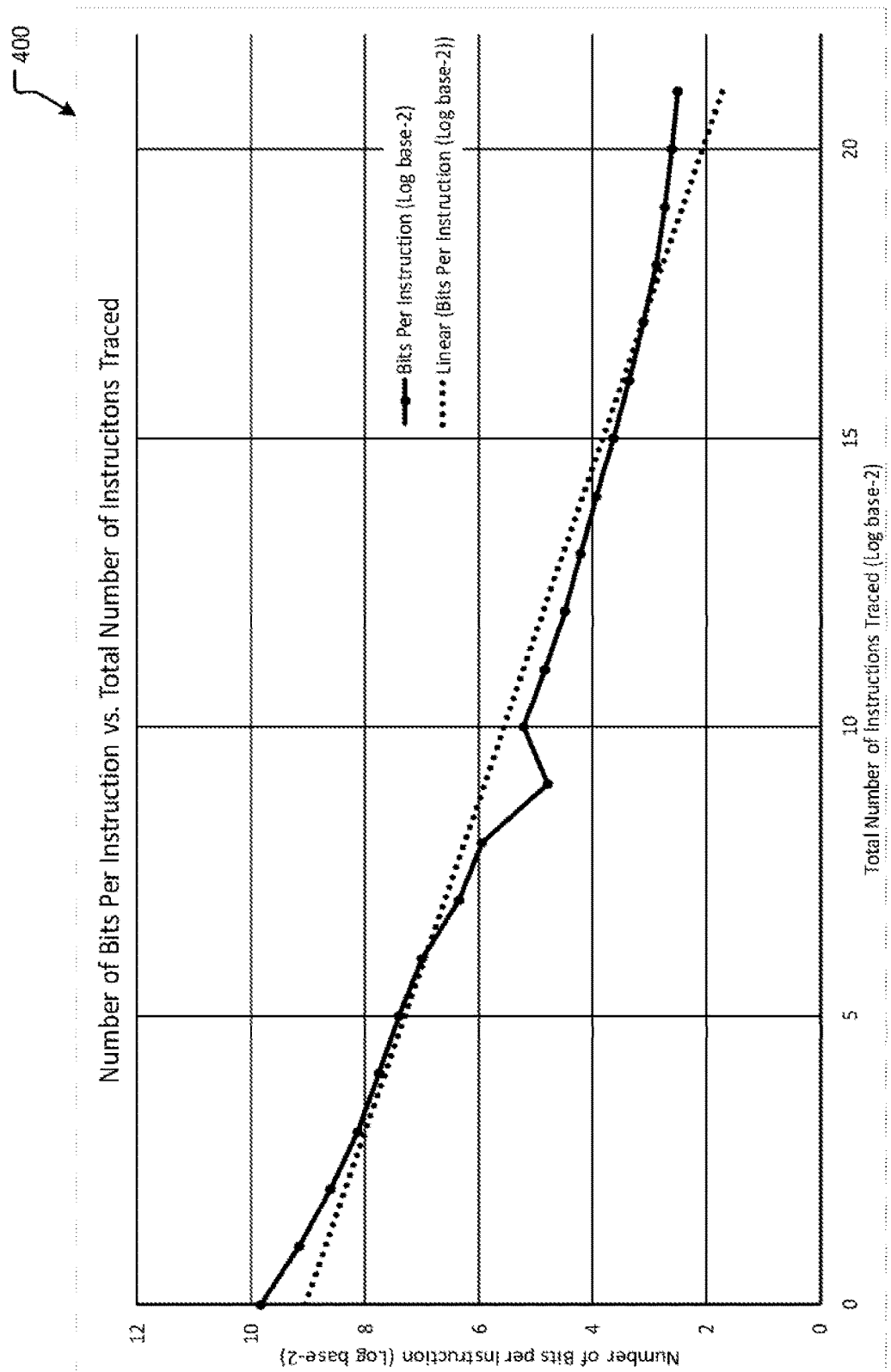
FIG. 4 illustrates a relationship between bits per instruction and a total number of instructions traced.

FIG. 4 illustrates a sample trend graph of a number of bits per instruction as the total number of instructions traced changes. A typical modern processor may process roughly a few billion instructions per second or more. According to the trend graph, trace data may be generated at close to $2^{10}$ (i.e., two to the power of ten or 1024) bits per instruction when the total number of instructions traced is $2^0$ (i.e., one). In contrast, the trace data may be generated at over $2^8$ (i.e., 256) bits per instruction when the total number of instructions traced is 16. The linear best-fit line, shown as a dotted line, further indicates that of the amount of trace data generated approaches less than about 3 bits per instruction when the total number of instructions traced is over $2^{21}$ (i.e., over two million). Thus, a burst of trace data may be generated at the start of tracing (e.g., at the beginning of thread execution or after a key frame). This burst of trace data may cause issues for the processor, which must log such trace data without loss of integrity and accuracy. As the processor speed becomes faster and computer systems and devices feature multiple processors, the issue of capturing (e.g., logging) trace data without loss of integrity and accuracy by the processors has become significant, especially when the processors attempt to log the trace data at an instruction level.

According to the present disclosure, various methods are disclosed for minimizing the effects of bursts of trace data. First, for instance, the rate of generating trace data for logging may be reduced by reducing a processing speed of one or more processors executing the program code when an amount of yet-to-be-logged trace data becomes higher than a predefined threshold. In some aspects, reducing processor speeds may be effective in controlling a rate of generating trace data, although this solution may be of limited use due to issues arising from possible timing issues caused by the different speeds of processors executing the program code being traced and processors executing other programs at normal speed. Second, logging trace data may temporarily be suspended when the volume of trace data to be logged becomes higher than a preset threshold, and then logging of trace data may be resumed when the amount of trace data to be logged subsides to the normal load. In aspects, suspending the logging of trace data may be maintained for only a short time so as to minimize the amount of trace data skipped for logging by the processor. Third, to address bursts in the amount of trace data, the yet-to-be logged (or pending) trace data may be evaluated to identify urgent and non-urgent trace data. In this way, the urgent trace data may be logged immediately whereas the non-urgent trace data may be logged at a later time. In this case, pending trace data may be classified and flagged based on whether the trace data requires immediate logging or whether the trace data may be logged at a later time. According to the present disclosure, various methods that address different aspects of logging, such as but not limited to selectively reducing a rate of generating trace data (e.g., by throttling processing speeds) or by selectively logging only certain types of trace data when an amount of traced data exceeds a threshold, thereby maintaining the integrity and accuracy of trace data for debugging.

In aspects, input data (e.g., data that is received and operated on by program code) may be logged as trace data. Further, where input data is known (i.e., logged), output data may be consistently and easily derived based on the program code. Accordingly, logging of output data may be unnecessary as long as input data is logged with reference to the program code. Thus, output data may be generated based on the program code and the input data by executing or playing back the program code and consuming the input data. The amount of trace data to be logged, therefore, may be reduced by logging input data only, and not logging output data.

FIG. 1 illustrates an example computing environment 100 that facilitates logging of trace data, which is generated by executing the program code associated with one or more cache lines of a processor. As depicted, embodiments may comprise or utilize a special-purpose or general-purpose computer system 102 that includes components of computer hardware, such as, for example, system memory 110, one or more processors 120, input/output hardware 130, and/or one or more data stores 160. These components may be connected by a data bus 104, enabling moving and copying of instructions and data among components.

Embodiments within the scope of the present application may include physical and other computer-readable media for carrying or storing computer-executable instructions and/or data structures. Such computer-readable media may be any available media that may be accessed by the computer system 102. Computer-readable media that store computer-executable instructions and/or data structures may include tangible computer storage devices (e.g., various types of memory). Computer-readable media that carry computer-executable instructions and/or data structures may be referred to as transmission media. Thus, by way of example and not limitation, aspects of the present application may comprise at least two distinctly different kinds of computer-readable media: computer storage devices and transmission media.

Computer storage devices may be physical hardware devices that store computer-executable instructions and/or data structures. Computer storage devices may include various types of computer hardware, such as RAM, ROM, EEPROM, solid state drives ("SSDs"), flash memory, phase-change memory ("PCM"), optical disk storage, magnetic disk storage or other magnetic storage devices, or other hardware device(s) which may be used to store program code in the form of computer-executable instructions or data structures, and which may be accessed and executed by the computer system 102 to implement the disclosed functionality. Thus, for example, computer storage devices may include the depicted system memory 110, the depicted data store 160, which may store computer-executable instructions and/or data structures, or other storage devices such as on-processor storage, as discussed later.

Transmission media may include a network and/or data links which may be used to carry program code in the form of computer-executable instructions or data structures, and which may be accessed by the computer system 102. A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer system, the computer system may view the connection as transmission media. Combinations of the above should also be included within the scope of computer-readable media. For example, the input/output hardware 140 may comprise hardware (e.g., a network interface module (e.g., a "NIC")) that connects a network and/or data link which may be used to carry program code in the form of computer-executable instructions or data structures.

Further, upon reaching various computer system components, program code in the form of computer-executable instructions or data structures may be transferred automatically from transmission media to computer storage devices (or vice versa). For example, computer-executable instructions or data structures received over a network or data link may be buffered in RAM within a NIC (e.g., input/output hardware 140), and then eventually transferred to the system memory 110 and/or to less volatile computer storage devices (e.g., data store 160) at the computer system 102. Thus, it should be understood that computer storage devices may be included in computer system components that also (or even primarily) utilize transmission media.

Computer-executable instructions may comprise, for example, instructions and data which, when executed at the processor(s) 120, may cause the computer system 102 to perform a certain function or group of functions. Computer-executable instructions may be, for example, binaries, intermediate format instructions such as assembly language, or even source code.

Those skilled in the art will appreciate that the present disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, wearable devices, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 160 may store computer-executable instructions and/or data structures representing application programs such as, for example, a tracer 162, an operating system kernel program 164, and application program 166 (e.g., the application that is the subject of tracing by the tracer 162, and one or more trace file(s) 168). When these programs are executing (e.g., using the processor(s) 120, the system memory 10 may store corresponding runtime data, such as runtime data structures, computer-executable instructions, etc. Thus, FIG. 1 illustrates the system memory 110 as including program code 112 and program runtime data 114 (e.g., each corresponding with application program 166).

The tracer 162 may be usable to trace execution of an application, such as application program 166, and to log trace data in the trace file 168. In some embodiments, the tracer 162 may be a standalone application, while in other embodiments the tracer 162 may be integrated into another software component, such as the operating system kernel program 164, a hypervisor, etc. While the trace file 168 may be depicted as being stored in the data store 160, the trace file 168 may also be recorded exclusively or temporarily in the system memory 110, or at some other storage device.

FIG. 1 includes a simplified representation of the internal hardware components of the processor 120. As illustrated, each processor 120 may include a plurality of processing units (122 and 124). Each processing unit may be physical (i.e., a physical processor core) and/or logical (i.e., a logical core presented by a physical core that supports hyper-threading, in which more than one application thread executes at the physical core). Thus, for example, even though the processor 120 may in some embodiments include only a single physical processing unit (core), it may include two or more processing units (such as 122 and 124) presented by that single physical processing unit.

Each processing unit (such as 122 and 124) may execute instructions that are defined by programs, such as but not limited to, tracer 162, operating system kernel program 164, and application program 166. The instructions may be selected according to a predefined processor instruction set architecture. The particular instruction set architecture of each processor 120 may vary based on processor manufacturer and processor model. Common instruction set architectures may be according to various architectures of processor chipsets. In general, an "instruction" may be a small, externally-visible (i.e., external to the processor) unit of code that is executable by a processor.

Each processing unit (such as 122 and 124) may obtain processor instructions from a cache line 126 (i.e., may be shared by the processing units 122 and 124), and may execute the processor instructions based on data in the cache line 126. In general, the cache line 126 is a small amount (i.e., small relative to the typical amount of system memory 110) of random-access memory that stores on-processor copies of portions of the system memory 110. For example, when executing the application program 166, the cache line 126 contains portions of the application runtime data 114. If the processing unit(s) 122 and/or 124 require data that is not already stored in the cache line 126, then a "cache miss" may occur, and that data may be fetched from the system memory 110 (potentially evicting some other data from the shared cache 126).

A cache line 126 may include a code cache portion and a data cache portion (not depicted). For example, when executing the application program code 166, the code cache stores at least a portion of the processor instructions stored in the application program code 166 and the data cache stores at least a portion of data structures of the application runtime data 114. A processor cache may be divided into separate tiers/layers (e.g., layer 1, layer 2, and layer 3), with some tiers (e.g., layer 3) potentially existing separate from the processor 120. Thus, the cache line 126 may comprise one of these layers (e.g., layer 1), or may comprise a plurality of these layers.

Each processing unit 122 and/or 124 may also include registers 128, which comprises a set of memory units for use by the processor 120, and which generally functions as non-volatile or volatile memory storage on the hardware of the processor and the processor instruction set architecture exposed by the processor 120 to executing applications.

As should be appreciated, the various methods, devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
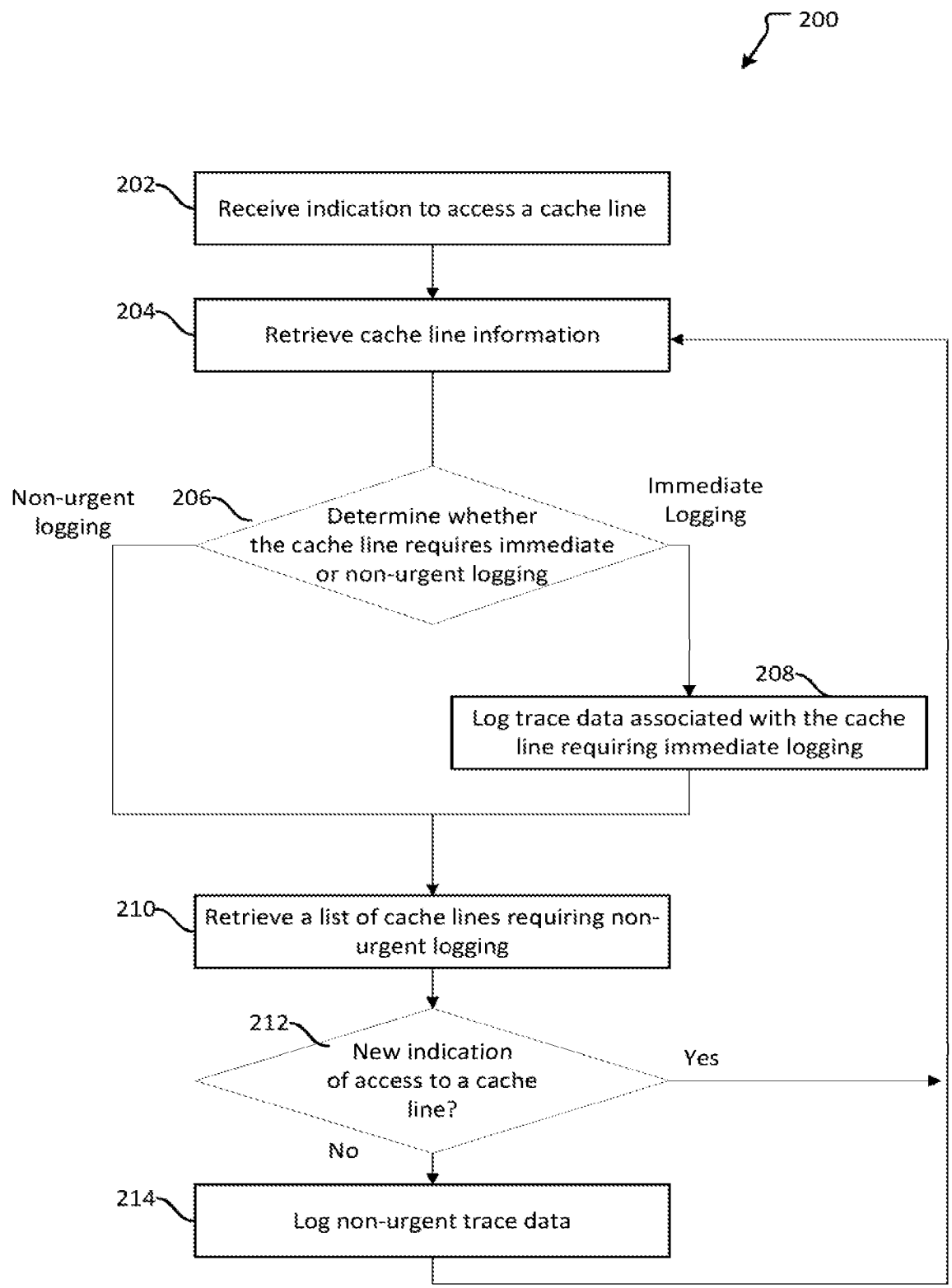
FIG. 2 illustrates a method of logging trace data at an instruction level.

FIG. 2 illustrates a method 200 for logging trace data for program code execution at instruction level, according to an example embodiment.

At a receive operation 202, an indication of access to a cache line may be received by the processor. Access to a cache line may include, for instance, reading or writing data to the cache line of at least one processor. In some aspects, access to the cache line to write data may trigger reading of data from main memory to the cache line if the data as specified does not exist in the cache line.

At a retrieve operation 204, information about the accessed cache line may be retrieved from the processor. For instance, the cache line information may include but is not limited to a type of access to the cache line, such as read or write; an index number of the cache line that is accessed; current status information about the cache line, such as but not limited to whether trace data related to the cache line need to be logged; and whether logging of trace data associated with the cache line has been completed.

At a determination operation 206, it may be determined whether trace data generated for the cache line requires immediate logging or whether logging may be delayed. In aspects, determination operation 206 may be based on cache line information, as described above. In some aspects, there may be a set of rules for determining whether trace data generated for the cache line needs to be logged immediately or may be delayed. For instance, trace data related to the cache line needs to be logged immediately if the access to the cache line is a write operation, whether or not the cache line was previously marked for delayed logging. In this case, trace data associated with such a cache line may be logged immediately before the data is overwritten by the write operation. In another instance, logging of trace data may be non-urgent when a read access to a cache line is received. For example, read access to a cache line may correspond to program code accessing a value in the cache line as input data for processing. In this case, the input data may be logged while any output data generated may not need to be logged. Additionally, in some aspects, logging trace data associated with the input data may not be urgent as long as the input data is not going to be overwritten in the cache line. Alternatively, if the input data in the cache line is to be overwritten, logging the associated trace data may be marked as urgent and may be done immediately. If it is determined that trace data associated with the cache line should be logged immediately, the method progresses to log operation 208. If it is determined that trace data associated with the cache line can be logged at a later time, the method proceeds to retrieve operation 210.

At a log operation 208, when it is determined that trace data associated with the cache line is urgent, the trace data may be logged immediately. For instance, the trace data may be immediately logged (e.g., in a log file of a database or other storage). In some aspects, such immediate logging may be executed as a priority. In some aspects, the immediate logging may be executed sequentially with other trace data marked for immediate logging (e.g., in the order in which the trace data was marked for immediate logging). When the trace data is identified for immediate logging, the processor may copy the trace data into one or more entries of a buffer within the processor. The buffer may be a short-term, minimum-capacity store from which the trace data may be written to memory when the processor has spare cycles for logging during concurrent code execution. In this way, while the buffered trace data pends logging by the processor, the copy of the trace data is preserved, i.e., the trace data will not be lost if the corresponding cache line is overwritten. However, as the processor generates more trace data that requires immediate logging, the buffer may become full. When the buffer becomes full, the processor may become unable to make forward progress in code execution while there exists a backlog of the trace data that requires immediate logging. In some aspects, the processor may monitor the status of the buffer usage, and may stall or slow processing when the buffer usage exceeds some predefined threshold. When the processor is slowed or stalled for code execution, more spare cycles may become available to process the buffer. In other aspects, logging of non-urgent trace data for a cache line may be delayed until some future access to the cache line changes the status of the cache line to require immediate logging of trace data. In further aspects, logging of non-urgent trace data for a cache line may be delayed until a time when the debugger application requires all the outstanding trace data for debugging purposes.

At a retrieve operation 210, a list of cache lines requiring non-urgent (e.g., delayed) logging may be retrieved. For instance, markers that indicate non-urgent (or delayed) logging for trace data associated with cache lines may be searched to generate a list of the cache lines. The list may be continuously updated by the processor as trace data associated with the cache lines in the list is logged while other processing, such as a new access event to one or more cache lines, does not interrupt the logging.

At a decision operation 212, it is determined whether a new indication of access to a cache line has been received. If there is a new indication of access to a cache line, trace data associated with the cache line may be logged as appropriate based on whether the trace data is marked as urgent or non-urgent, as described above.

If there is no indication of access to a cache line, then the method may progress to log operation 214. At log operation 214, the non-urgent logging of trace data may continue until high priority trace data (e.g., resulting from a write event to a cache line) interrupts the logging of the non-urgent trace data.

In some aspects, a burst of trace data may be generated at the beginning of tracing and/or upon processing a key frame, such as a context switch. As described above, some access to cache lines results in trace data that should be logged immediately (e.g., write access to a cache line), whereas the logging of other trace data can be delayed (e.g., read access to a cache line), and whereas still other trace data may not require logging at all (e.g., output data). By postponing the logging of non-urgent trace data the system may be able to address the burst of trace data without skipping trace data or throttling the processors. As time elapses after the start of tracing, the number of bits per instruction may decrease as illustrated in FIG. 4, thereby allowing the logging of a burst of trace data to eventually catch up and then, as the curve flattens over time, to maintain the logging rate at about the generation rate.

In some cases, delaying the logging of some (non-urgent) trace data in order to address bursts of trace data may be insufficient, particularly if there is a large number of cache lines that require immediate logging of trace data. To remedy this issue, one or more additional methods to reduce the amount of trace data generated (e.g., by throttling processing speeds) or to control logging of the trace data (e.g., by suspending logging for a period of time) may be employed.

As should be appreciated, operations 202-214 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3A:
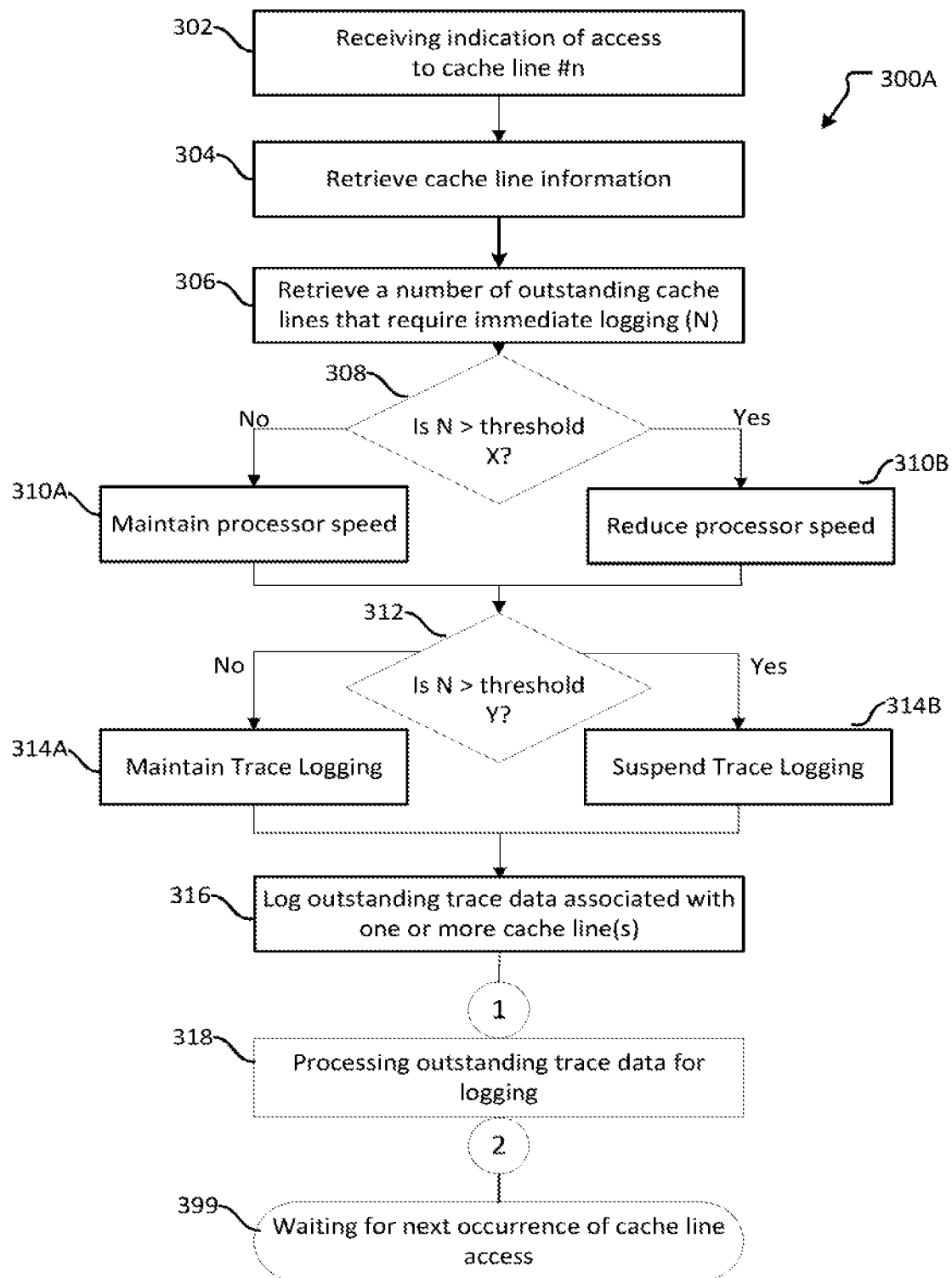
FIGS. 3A-3D illustrate first, second, and third methods of processing trace data at an instruction level with prioritized logging.

FIG. 3A illustrates a method of processing trace data according to the present disclosure. At a receive operation 302, an indication of access to a specific cache line (#n) may be received as a trigger to process trace data. Such an indication may include but is not limited to receiving an indication of a read or a write to a cache line. In aspects of the present disclosure, an indication of access to one or more cache lines may indicate possible changes to the cache line, e.g., changes to input data, which may need to be logged by the processor.

At a retrieve operation 304, information about the accessed cache line may be retrieved from the processor. For instance, the cache line information may include but is not limited to a type of access to the cache line, such as read or write; an index number of the cache line that is accessed; current status information about the cache line, such as but not limited to whether trace data related to the cache line need to be logged; and whether logging of trace data associated with the cache line has been completed.

At a retrieve operation 306, a number (N) representing a number of outstanding cache lines that require immediate logging of trace data may be retrieved. There may be cache lines that require immediate logging (e.g., urgent trace data) and cache lines for which logging of trace data may be delayed. In aspects, outstanding (or pending) cache lines that require logging may be marked or flagged.

At a determination operation 308, the number of outstanding cache lines that require immediate logging, N, is compared to a first threshold X to determine whether processor speed(s) (e.g., the net processing speed across one or more processors) should be throttled or temporarily stalled for code execution. In aspects, the first threshold X indicates a threshold number of outstanding cache lines with trace data that the system is able to log immediately without adjusting processor speed(s). In some alternative examples, N may be a number of buffer entries available for logging within the processor, while the first threshold X is a threshold number of buffer entries (such as but not limited to 50% of the buffer entries, for instance) in the processor. When N is greater than first threshold X, then, at reduce operation 310B, the processor speed(s) may be throttled or temporarily stalled until more entries of buffer becomes available and the processor is able to log trace data immediately. By reducing processor speed(s), and thereby reducing the rate at which trace data is generated, the overall number of outstanding cache lines requiring trace data logging immediately may be decreased. Alternatively, if a value of N is not greater than first threshold X, at maintain operation 310A, processor speeds may be maintained at a normal speed.

In some aspects, different thresholds may be used to determine when processor speed(s) should be adjusted. For instance, in a different aspect, N may be a rate of generating trace data per instruction, and first threshold X may be a threshold rate of generating trace data per instruction that can be logged immediately at normal processing speeds. In yet another aspect, N may be a trace data volume generated per time or per instruction and the first threshold X may be a respective threshold for a trace data volume that can be logged immediately at normal processing speeds.

At determination operation 312, N may be compared against a second threshold Y. In aspects, the second threshold Y may indicate a threshold number of outstanding cache lines with trace data that the processor is able to log immediately without suspending trace logging. For instance, trace logging may be suspended at a suspend operation 314B when a number of outstanding cache lines to be logged is greater than the second threshold Y and thus having too much outstanding trace data than require to be logged immediately. On the other hand, when N is not greater than second threshold Y, at maintain operation 314A, logging trace data may be maintained. As should be appreciated, determination operation 312 may be evaluated prior to determination operation 308. That is, determining whether to suspend trace logging may occur prior to determining whether to reduce processor speeds when the number of outstanding cache lines with trace data exceeds a threshold. Additionally or alternatively, the determination operation 312 may determine whether to suspend trace logging based on a time period that the processor has been stalled. In some aspects, a time period that the processor may be stalled may be limited and code execution may resume after such time period. In some cases, trace logging may be suspended for some period when the processor initially resumes code execution.

In embodiments, reduce operation 310B, selectively throttles or stalls a limited portion of a processor, while leaving other portion(s) of the processor unaffected by reduce operation 310B. For instance, in a multi-core processing environment, reduce operation 310B might only throttle or stall those processor core(s) executing code to which the trace data applies, while refraining from throttling or stalling one or more other processor core(s). For instance, reduce operation 310B might reduce a clock rate of a particular core executing a thread for which trace data applies, while leaving the clock rate(s) of one or more other cores unaffected. When the particular core switches to different thread that is not being traced, the clock rate reduction for that core can be reversed.

In embodiments, reduce operation 310B may throttle or stall processor speed(s) only when a processor is executing code for a context for which the trace data is being generated. For instance, a thread or process for which trace data is being generated might be associated with some identified context, such as a virtual machine identifier (VMID), a virtual processor identifier (VPID), a process identifier (PID or PSID), a virtual PID/PSID, a thread identifier (TID or TSID), and the like. Proxies for any of the foregoing could alternatively be used—for example, if a given processor might not offer one or more of the foregoing features. For instance, the root of a page table (also referred as page table base address, or PTBA) could used as a proxy for a PID/PSID. In embodiments, reduce operation 310B only throttles or stalls processor speed(s) when the processor is executing within this identified context (VMID, VPID, PID/PSID, virtual PID/PSID, TID/TSID, etc.), and restores normal processor speeds when executing one or more other context(s). Additionally, reduce operation 310B may throttle or stall only those processor core(s) that are executing within this identified context, while leaving other core(s) unaffected. As such, reduce operation 310B can limit the effects of processor speed throttling/stalling to only the context that is being traced, while enabling other execution contexts to execute without any speed throttling.

At log operation 316, outstanding trace data associated with one or more cache lines may be logged. In aspects of the present disclosure, logging trace data associated with cache lines may be postponed as needed, such as when the number of outstanding cache lines with trace data exceeds a threshold (e.g., first threshold X or second threshold Y). Cache lines associated with trace data that may be logged later (e.g., non-urgent trace data) may be marked accordingly.

At a processing operation 318, outstanding trace data may be processed. For instance, outstanding trace data may be logged immediately or marked for delayed logging. Cache lines marked for later logging may be logged immediately if the processor is available in order to keep these cache line in an "up-to-date" status. After processing the outstanding trace data at the processing operation 318, at a waiting operation 399, the system may wait for a next indication of a cache line access.

According to the method 300A, logging of non-urgent trace data may be processed when the processing load level is low. When the processing load level is higher than a third threshold (e.g., third threshold Z), the available processors may be unable to log outstanding trace data. In this case, trace logging may be suspended until the processing load level becomes low enough (e.g., below the third threshold Z) to resume logging the outstanding trace data (e.g., at log operation 316). Alternatively, when the processing load level is higher than the third threshold (e.g., third threshold Z), processor speeds may be reduced so as to reduce an amount of trace data generated.

In aspects of the present disclosure, trace data associated with a cache line may be logged under various circumstances. For instance, trace data associated with a cache line may be marked for delayed logging when access to a cache line results in a cache miss (e.g., when needed data is not in the cache line). In other aspects, trace data associated with a cache line may require immediate logging when a write access occurs on a cache line (e.g., resulting in changing the data in the cache line). In this case, trace data my need to be logged immediately before the data in the cache line is overwritten by the write access, which would result in trace data being lost. Additionally or alternatively, the value of first threshold X may be larger than the second threshold Y. That is, the threshold for reducing processing speed may be lower that the threshold for suspending trace logging.

As should be appreciated, operations 302-399 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3B:
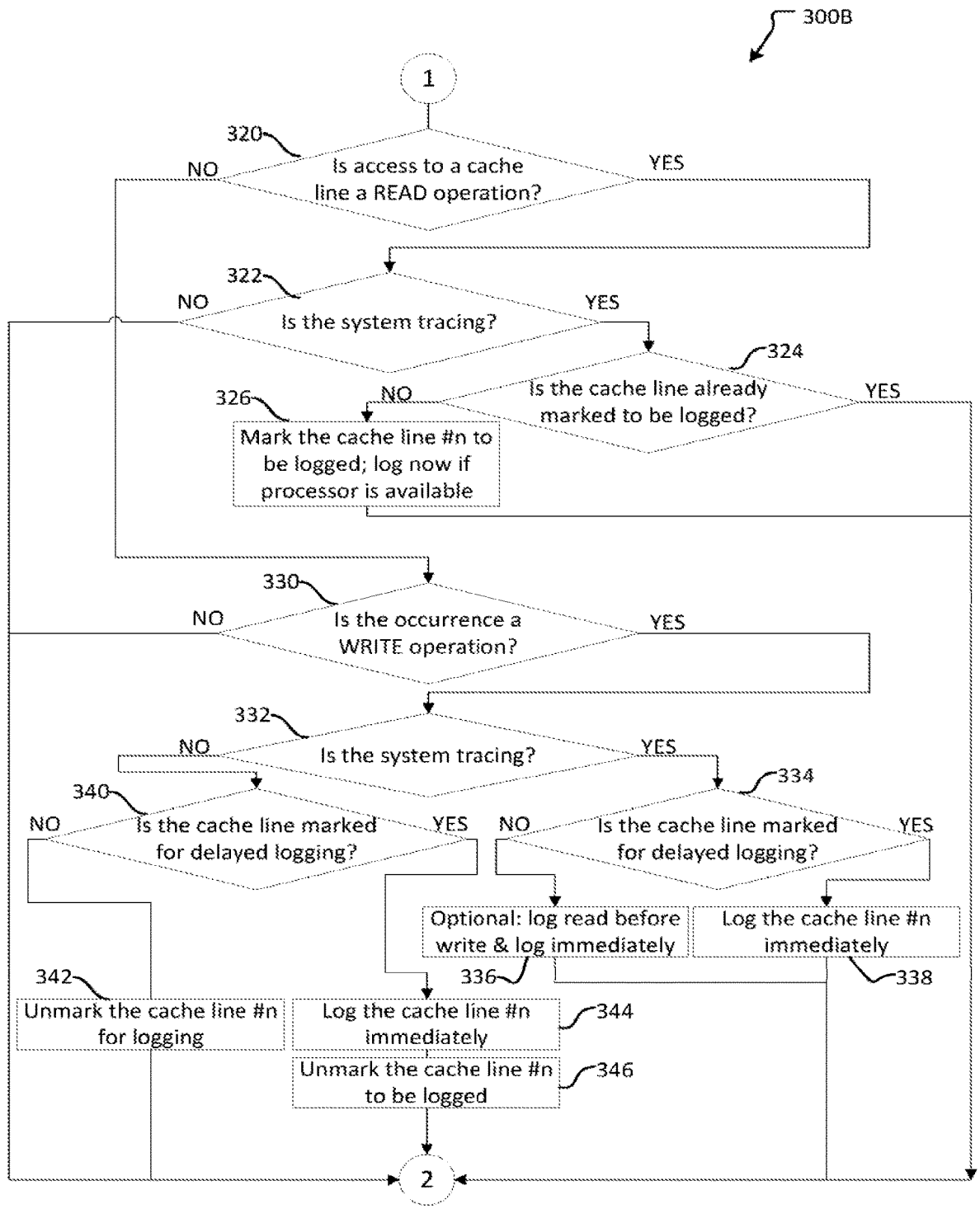

FIG. 3B illustrates a method of processing trace data according to the present disclosure. The method 300B illustrates example operations occurring between (1) and (2) of FIG. 3A.

At determination operation 320, it may be determined whether the access to the cache line is a READ operation. As should be appreciated, the cache line is not altered by a READ operation. If the access is a READ operation, the method may progress to determination operation 322. If the access is not a READ operation, the method may progress to determination operation 330.

At determination operation 322, it may be determined whether execution of program code is being traced. If the system is not tracing, the method may progress to (2). If the system is tracing, the method may progress to determination operation 324, where it may be determined whether the trace data associated with the cached line is marked for logging. If the trace data is marked for logging, the method may progress to (2); alternatively, if the cached line is not marked for logging, the cache line #n may be marked for delayed logging according to a mark operation 326 and the method may progress to (2). At the mark operation 326, the cache line #n may be marked to be logged. In this case, the processor may log the trace data immediately if the processor is available to log the trace data in order to keep the cache line in an "up-to-date" status. In some aspects, the operation to mark the cache line as up-to-date may depend on how the statuses of cache lines are maintained. For instance, if the status of completed logging of respective cache lines is maintained on a per-cache line basis (e.g., Logging Completion Flag 510 in FIG. 5), then the processor may log the trace data immediately if the processor is available. If the status of completed logging of respective cache lines is maintained by groups of cache lines (e.g., via Global Index Number 602 in FIG. 6), the processor may delay logging of the trace data even when the processor is available if the cache line is in a group of cache lines that are yet to be logged (i.e., not up-to-date), while the processor may immediately log the trace data associated with the cache line if the cache line is in a group of cache lines that is up-to-date.

At a determination operation 330, it may be determined whether the access to the cache line is a WRITE operation. If the access is not a WRITE operation, the method may progress to (2). If the access is a WRITE operation, the method may progress to determination operation 332, where it is determined whether the system is tracing. If the system is not tracing, the method may progress to determination operation 340, where it is determined whether the cache line is marked for delayed logging. If the cache line is marked for delayed logging, the method may progress to a log operation 344, where the cache line #n is logged immediately. The method may progress to a unmark operation 346, where the cache line #n is unmarked for logging. If the cached line is not marked for delayed logging at the determination operation 340, the method may progress to an unmark operation 342, where the cache line #n may be unmarked. If the system is tracing, the method may progress to determination operation 334, where it is determined whether the cache line is marked for immediate logging. If the cache line is marked for immediate logging, the method may progress to a log operation 338, where the cache line #n may be logged immediately, and then may progress to (2); otherwise, if the cache line is not marked for immediate logging, the method may progress to (2), while there may be an optional operation to log a READ operation before the WRITE operation and then log the trace data immediately. That is, the WRITE operation may be logged as READ and WRITE operations and the trace data for the cache lime may be logged immediately.

In some aspects of the present disclosure, the system may trace execution of application program code under a user mode and may not trace execution of operating system kernel program code under kernel mode. For instance, application program code may instruct to write data, followed by operating system kernel program code overwriting the data in the system under kernel mode. When the application program code instruct to read data, at least one cache line may be accessed and the data from an address as specified by the application program code may be read from the cache line.

In some aspects, multiple indications of access to a cache line may be received at the receive operation 302. A first access may be a READ operation to a cache line, as determined at determination operation 320. In this case, the system may mark the cache line to be logged later according to the marking operation 326. In further aspects, after the READ operation, an operating system kernel code may write different data to the same cache line under a kernel mode. In this case, execution under the kernel mode may not be traced and the subsequent WRITE operation may unmark the cache line for logging. At a later time, when the system is tracing and application program code reads data from the same cache line, the cache line may again be marked for logging, according to the marking operation 310. Accordingly, in some aspects of the present disclosure, the system may trace information related to user mode executions only, while retaining integrity and consistency of the logged trace data.

In some aspects, marking respective cache lines for logging, either for delayed logging or for immediate logging, may be implemented as a set of bits or flags associated with respective cache lines.

Figure 3C:
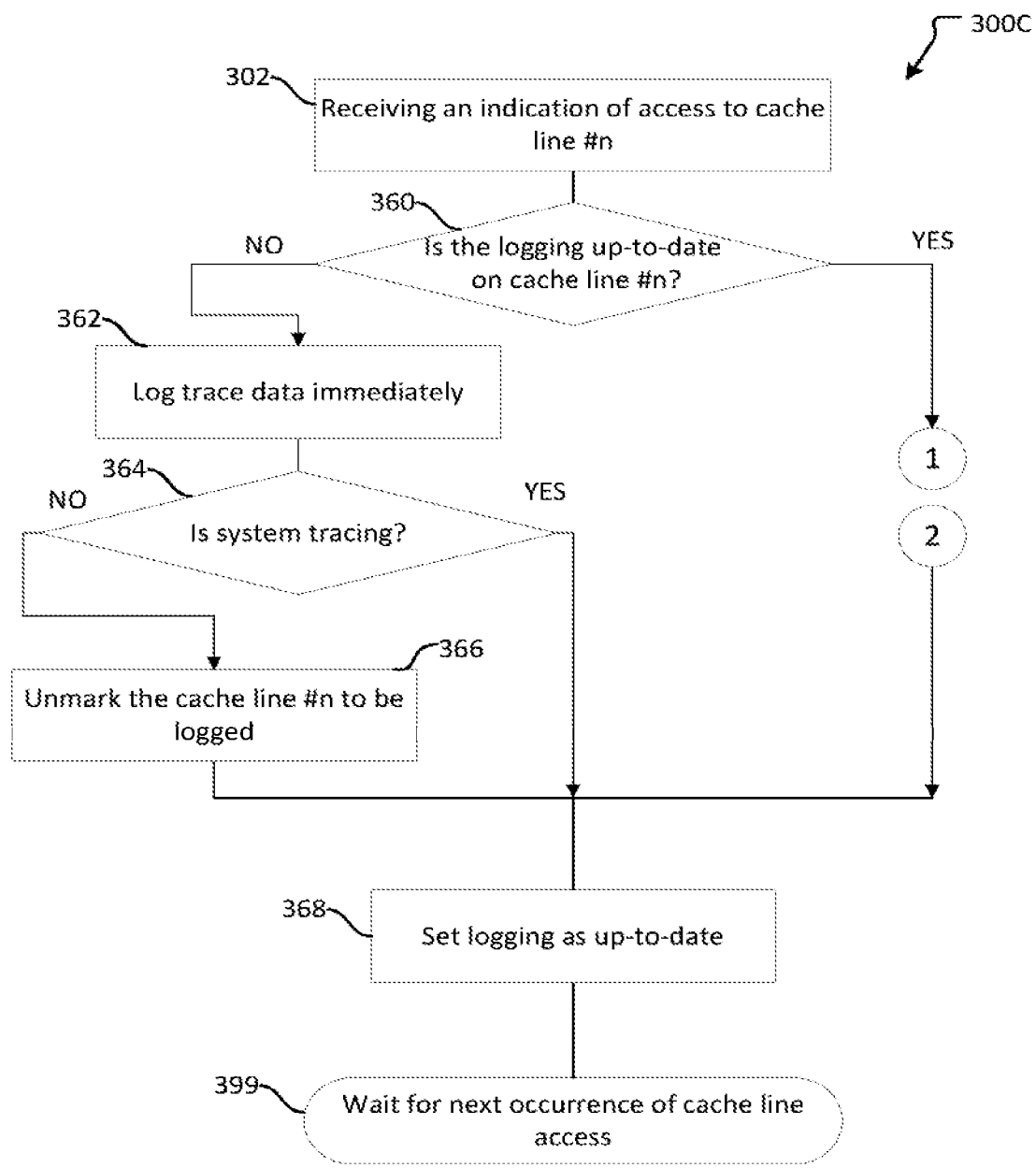

FIG. 3C illustrates a method of processing trace data based on whether logging of a cache line is up-to-date. In some aspects, logging of a cache line may be up-to-date or not up-to-date, based on whether the trace data associate with the cache line has been logged. Such statuses of cache lines may be maintained by various means, including but not limited to Log Completion Flag 510 in FIG. 5 and a global index value (e.g., Global Index Number 602 in FIG. 6). Logging of a cache line may be up-to-date when the Log Completion Flag 510 is TRUE. The global index value may be used as a place holder to store an index number for each cache line in order to manage which cache lines have been logged and which cache lines need to be logged. For instance, cache lines with index numbers less than a particular value in a global index may already be logged; therefore, logging of the cache line is up-to-date. Conversely, cache lines with index numbers that are equal to or greater than the particular value in the global index may not yet be logged. An indication of access to a cache line with an index number less than the particular value may require immediate logging because trace data associated with the cache line has already been logged. An indication of access to a cache line with an index number equal to or greater than the particular number, where the access is not a WRITE access may result in marking the cache line for delayed logging. As should be appreciated, other scenarios are possible.

At a receive operation 302, an indication of access to a specific cache line (#n) may be received as a trigger to process trace data. Such an indication may include but is not limited to receiving an indication of a read or a write access to a cache line. In aspects of the present disclosure, an indication of access to one or more cache lines may indicate possible changes to the cache line, e.g., changes to input data, which may need to be logged by the processor. The access may be as a result of executing instructions based on various types of program code including but not limited to application program code and operating system kernel code.

At a determination operation 360, a determination operation may determine whether logging of the cache line #n is up-to-date. If the logging of the cache line #n is not up-to-date, trace data that is associated with the cache line may be logged immediately according to a log operation 362. At a determination operation 364, it may be determined whether execution of program code is being traced. If the system is not tracing, the method may progress to an unmark operation 366, where the cache line #n is unmarked for logging. The method may then progress to the wait operation 399, where a next occurrence of access to the cache line may be listened for. If the system is tracing, then the method may progress to a set operation 368, where logging is set as up-to-date. The method may then progress to the wait operation 399, where a next occurrence of access to the cache line access may be listened for. If the logging of cache line #n is up-to-date, then the processing of the cache line #n and logging of trace data may be performed between (1) and (2), according to FIG. 3B. After completing the processing between (1) and (2), the method may progress to a set operation 368, where logging is set as up-to-date, and the method may progress to wait operation 399, where a next occurrence of access to the cache line access may be listened for.

In some aspects, cache eviction on a cache line may result in immediate logging of trace data that is associated with the cache line. As there may be a finite number of cache lines available in a memory, there may be a situation where one or more of the cache lines may be evicted and replaced by data from another memory address. As the existing data of the cache line being evicted will be lost, trace data for the cache line may need to be logged immediately (e.g., before the data is overwritten by new data from a different address).

As should be appreciated, operations 302-399 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

In some aspects of the present disclosure, trace data may not be logged every time a cache line is accessed. For instance, trace data associated with a cache line that is accessed for a WRITE operation may need to be logged immediately before the existing data is overwritten by the WRITE operation. The output data based on the WRITE operation, however, may not be logged because the processor may generate the output data from the WRITE operation based on the input data from the cache line along with the program code instructions related to the WRITE operation (e.g., by replaying the instructions). Cases where trace data associated with a cache line is logged immediately may include, but are not limited to the following: first, there may be a cache line that is being evicted by the processor and trace data must be logged immediately before the data of the cache line is overwritten; and second, there may be a cache line accessed for a WRITE operation and trace data must be logged immediately before the data of the cache line is overwritten.

For the latter case, where a cache line is accessed by a WRITE operation, processing the trace data may be handled in at least two different ways. First, there may be a situation where there is WRITE access to a cache line for which logging is up-to-date (e.g., a cache line with an index number less than the value of the global index number X) and the cache line is marked to be logged. As shown by the log operation 338 in FIG. 3B, trace data associated with the cache line may be logged immediately, before the existing data is overwritten by the WRITE operation. Second, there may be a situation where there is a WRITE access to a cache line for which trace data is not up-to-date (i.e., yet to be logged) (e.g., a cache line with an index number that is greater than or equal to the global index number X and the cache line is marked to be logged). As shown in the mark operation 362, trace data related to the cache line may be logged immediately, before the existing data is overwritten by the WRITE operation.

In both cases, potentially extra and unnecessary logging of trace data may arise when a WRITE access occurs to a cache line that is marked to be logged. In another aspect of the present disclosure, status of respective cache lines according to a cache coherency protocol may be used to reduce logging of trace data associated with a cache line when there is a WRITE access to the cache line. Cache coherency protocol provides an indication of a status of a respective cache line. For instance, there may be a status that indicates when a cache line has been modified, and the data in the cache line may be inconsistent with data at its corresponding address in the memory. In another instance, there may be a status that indicates when a cache line has not been modified. There may be a variety of models for cache coherence protocols such as the MSI protocol (Modified-Shared-Invalid) and MESI protocol (Modified-Exclusive-Shared-Invalid), as well as MOESI protocol (Modified-Owned-Exclusive-Shared-Invalid). In the MESI protocol, the state 'E' ("Exclusive": the cache line matches with main memory) may be used to depict a status of Write Cache Status for processing efficiency perspective because READ operations may not necessarily be altering the status of Write Cache Status of a cache line. In contrast, the state '0' ("Owned": the cache line being owned and shared) of the MOESI protocol may be unsuitable for use as Write Cache Status because there may be other readers of the cache line.

In some aspects, processors, such as those shown as Processors 120 in FIG. 1, may manage cache lines according to cache coherency protocols. Cache coherency protocols may provide protocols to manage status of caches with respect to being coherent with memory. For instance, data in a cache line and its corresponding data in main memory may be expected to be the same. However, there may be a situation where a data in a cache line has been modified, and the data is no longer the same as its corresponding data in memory. Cache coherency protocols provide well-defined status indicators to manage coherency between cache and memory, whether data in a cache line is identical (i.e. Write Cache Status is FALSE) with its corresponding data in the memory, or if it is modified (i.e. Write Cache Status is TRUE), where the cache line contains newer data than the memory. The status according to a cache coherency protocol may be set and modified by one or more processors. In some aspects, Write Cache Status for a cache line may be set to FALSE when logging of trace data associated with the cache line completes. Since a value of data in main memory and its corresponding cached data in a cached line are the same when logging of trace data is completed (i.e., Write Cache Status is not in Modified state), Write Cache Status may be used as an indicator for logging completion of the cache line.

Figure 3D:
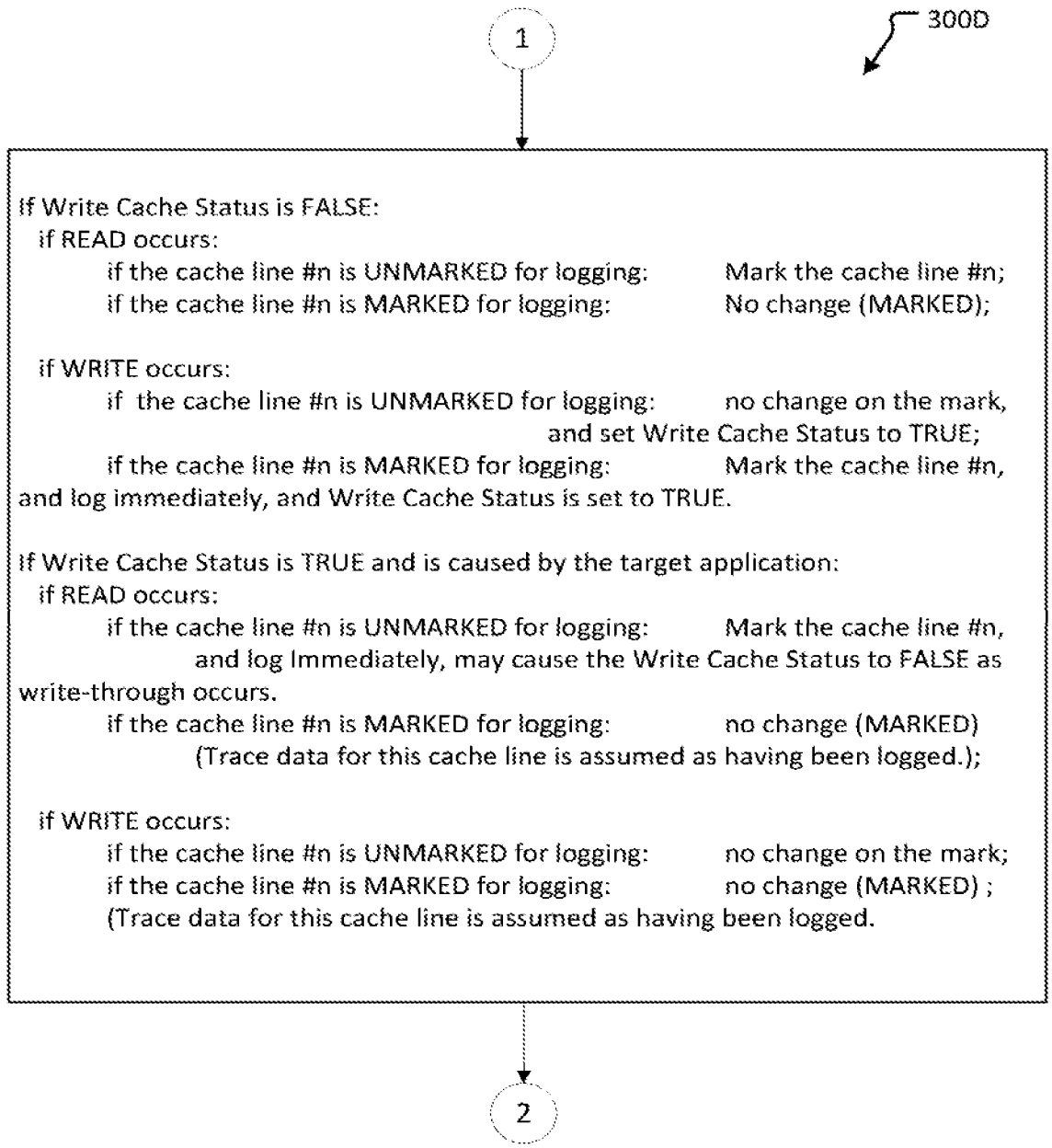

FIG. 3D illustrates an example of processing trace data according to some aspects of the present disclosure to further reduce a volume of trace data being logged while retaining accuracy and integrity. A status of a cache line based on cache coherency protocols may be used to determine if data in the cache line and data in its corresponding location in memory are the same. For instance, trace data associated with cache lines may be processed by marking cache lines to indicate whether trace data associated with the cache line needs to be logged. Additionally, the cache line may be checked for a cache coherency status, particularly when the cache line has been modified, according to one or more cache coherency protocols. The processing of trace data in FIG. 3D may follow (1) and precede (2).

In some aspects, a status of cache line when a WRITE access takes place may be leveraged to reduce possible extra logging of trace data. In addition to checking the marker indicating that trace data for a corresponding cache line is to be logged, the system may determine whether the access is a READ or WRITE access.

In some aspects, trace data may be processed when Write Cache Status for a cache line is FALSE. If a READ access to the cache line occurs and if the marker at the time is UNMARKED, the marker for the cache line may be set to MARKED for delayed logging. If a READ access to the cache line occurs and if the marker at the time is MARKED, then there may be no change to the marker or the Write Cache Status (remains TRUE). If there is a WRITE access and if the marker is UNMARKED, then there may be no need for further action based on the condition except to set the Write Cache Status to TRUE. If the marker is set to MARKED, trace data associated with the cache line may be logged immediately, and the Write Cache Status may be set to TRUE.

In some aspects, trace data may be processed for cases where Cache Write Status is TRUE and writing to the cache is by an application program that is being debugged. When there is a READ access to a cache line and if the marker for the cache line is UNMARKED, then the marker may be set TRUE and the trace data associated with the cache line may be logged immediately. Additionally or alternatively, Write Cache Status may be set to FALSE by various means such as but not limited to by ensuring the cache line is consistent with the main memory according to the cache coherency protocols. If Write Cache Status is set to FALSE, a further optimization in processing may be done by not logging the trace data immediately. Trace data associated with a cache line with the marker being TRUE and Cache Write Status being TRUE may have already been logged. When there is a READ access to a cache line and if the marker is MARKED, there may be no changes made based on the condition. Performing a READ access may be done while Cache Write Status for the cache line is TRUE. When there is a WRITE access to a cache line and if the marker is FALSE, there may be no need to further process for this condition. When there is a WRITE access to a cache line and if the marker is MARKED and Cache Write Status is TRUE, then there is no action to take. There may be no need to log the data since it is already logged.

In some aspects, in a case where a cache line is being evicted, trace data associated with the cache line may be logged immediately. There may be situation where a processor writes data to cache lines with Cache Write Status being TRUE to ensure values in the cache line and the memory are consistent. A cache line with Cache Write Status being TRUE may potentially lose the TRUE status as the processor flushes its pending writes to memory and potentially other processors ask for shared access to this cache line. However, accuracy of trace data may be retained because of logging trace data more than once.

Figure 5:
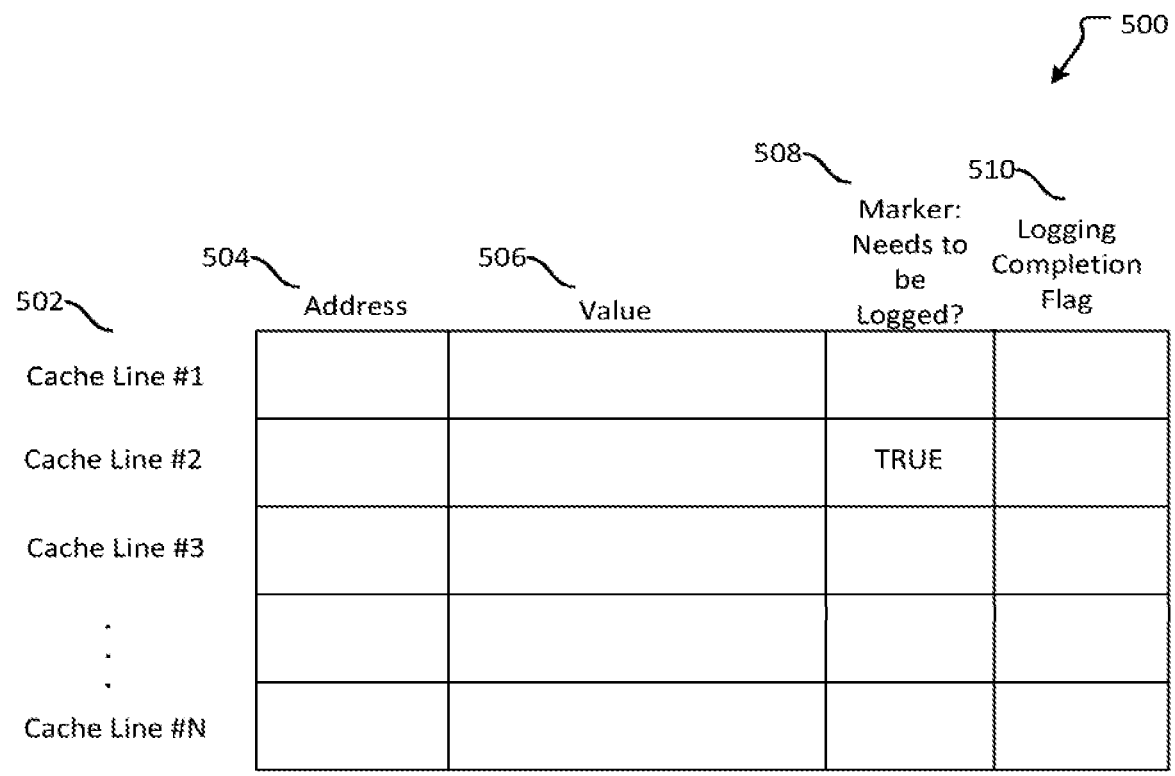
FIG. 5 illustrates an example of cache lines with indicators to control logging trace data.

FIG. 5 illustrates an example of cache lines with indicators for controlling logging of trace data. As depicted, the cache 500 includes a plurality of cache lines 502, each of which includes an address portion 504, a value portion 506, as well as a marker 508 that may maintain a status regarding whether the trace data associated with the cache line needs to be logged immediately or may be logged at a later time. A flag 510 may indicate whether the cache line has been logged. For simplicity in illustration, Cache line #1, #2, #3, and #N are shown. While only four cache lines 502 are shown, one of ordinary skill in the art will recognize that an actual shared processor cache may have many more cache lines. Marker 508 indicates whether trace data associated with the cache line needs to be logged. For instance, Marker 508 may be set to TRUE when the corresponding cache line needs to be logged; Marker 508 may be set to FALSE when the corresponding cache line does not need to be logged. In aspects, trace data may include but is not limited to an address and a value of the cache line, but may also include registers, contents of main memory, as well as instruction code at the time the trace data is logged. In some aspects, the logged trace data may be used by a debugger application to replay program code execution in a debugger system. As shown in FIG. 3B, Marker 508 may be used during processing trace data to check if a corresponding cache line needs to be logged at a determine operations such as the determine operation 324, the determination operation 340 and the determination operation 334. Furthermore, Marker 508 may be used to mark or unmark the corresponding cache line at marking operations such as the marking operation 326 and the unmarking operation 342 and the unmark operation 346 in FIG. 3B.

As should be appreciated, the various methods, devices, components, etc., described with respect to FIG. 5 are not intended to limit the systems and methods to the particular components described. Accordingly, additional topology configurations may be used to practice the methods and systems herein and/or some components described may be excluded without departing from the methods and systems disclosed herein.

Figure 6:
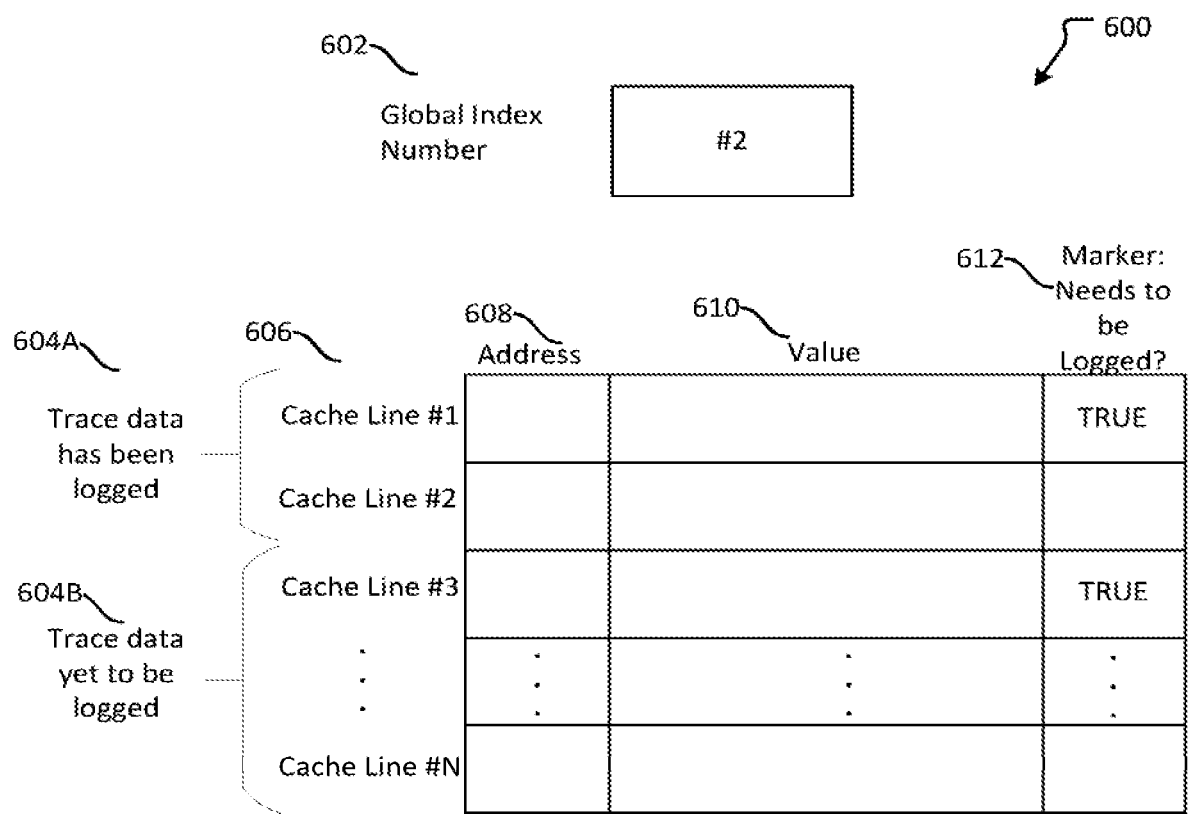
FIG. 6 illustrates an example of cache lines with indicators to control logging trace data.

FIG. 6 illustrates processing trace data associated with cache lines by using a global index number. Global Index Number 602 may store at least one index number for a cache line 606. The Global Index Number 602 may indicate how far, in terms of cache line index number, trace data has been logged. For instance, Global Index Number 602 contains a value #2, specifying Cache Line #2. According to an example shown in FIG. 6, trace data associated with Cache Line #1 and Cache Line #2 has been logged. Trace data for the rest of the cache lines has not been logged. The cache table may comprise a cache line index number 606, address component 608, value component 610, and a Marker 612 that may indicate whether trace data associated with its corresponding cache line needs to be logged.

In FIG. 6, trace data associated with Cache Line #1 and Cache Line #3 needs to be logged. Based on the method of processing trace data as shown in FIG. 3C, the conditional operation 340 may compare the cache line index number n, to which an access has been received, with global index number X, which is #2. In some aspects, access to cache lines with an index number that is less than the value of Global Index Number 602 (e.g., #2 in the example), may result in immediate logging of the trace data associated with the cache line being accessed. When the processor is available to process logging trace data instead of using cycles for code execution, the cache lines 604B (which correspond to a group of cache lines where trace data is yet to be logged) may be logged. The time limit to log trace data associated with cache lines with index number greater than or equal to the Global Index Number 602 may be undefined.

Figure 7:
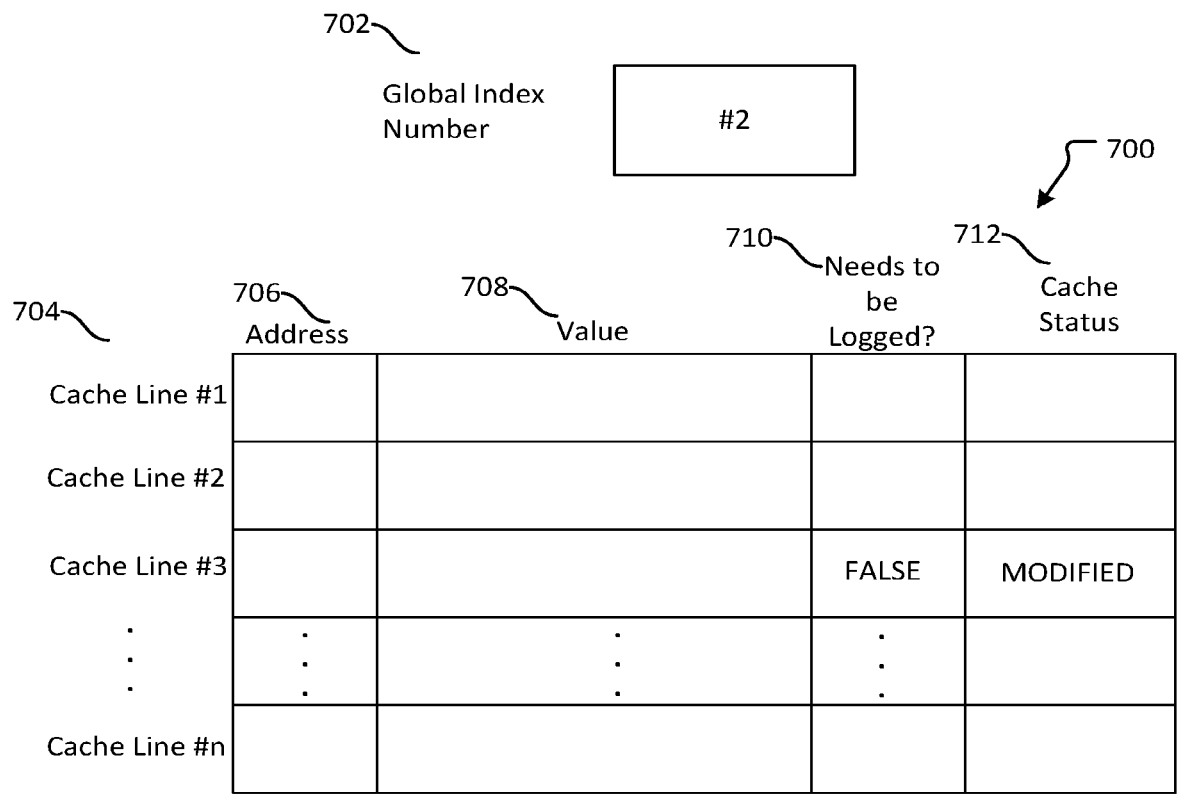
FIG. 7 illustrates an example of cache lines with indicators to control logging trace data.

FIG. 7 illustrates an example of cache lines with indicators to control logging trace data. Global Index Number 702 may store and manage a cache line index number that may indicate cache lines that have been logged. The Global Index Number 702 may be used similar to the Global Index Number 602 in FIG. 6. The cache line table 700 may include a list of cache lines 704. The list may contain information about respective cache lines, such as an address 706 in memory corresponding to each of cache lines 704, a values 708 of data in each respective cache line, an indicator 710 indicating whether each respective cache line needs to be logged, as well as a Cache Status indicator 712. The Cache Status indicator 712 may indicate a Write Cache Status as described in FIG. 3D. The example as illustrated in FIG. 7 may be used as described with respect to FIG. 3C and FIG. 3D. For instance, the indicator 710, which indicates whether the cache line needs to be logged may have a value "FALSE" (unmarked) for Cache Line #3. Cache Status indicator 712 of Cache Line #3 may have a value "MODIFIED," which may be interpreted the same as having a value "TRUE" in Write Cache Status parameter (see FIG. 3D). Based on the example as shown in FIG. 3D, when a WRITE access occurs on the Cache Line #3 while Write Cache Status is TRUE and the cache line is unmarked for trace logging, then, the Cache Line #3 may be marked for immediate logging, which may result in changing the value of Write Cache Status to FALSE because data in Cache Line #3 and its corresponding data in main memory match when logging of the trace data associated with Cache Line #3 is completed.

In some aspects, the Global Index Number 702 may be used in place of the Logging Completion Flag 510, while maintaining the integrity and accuracy of processing trace data. A value in the Global Index Number 702 may be a low number such as #1 at the beginning of tracing or after a key frame when a burst of trace data being generated at that time. During such a situation, there may be a significant number of cache lines with which traced data is associated to be logged immediately. In addition, most of the cache lines may not be utilized during the early phase of tracing, which may start after flushing the cache lines. As tracing proceeds and more program code instructions are executed, a value in Global Index Number 702 may increase while cache lines that need to be logged may be logged at a later time, e.g., when the system load level becomes low and stable.

While not shown in the above Figures, cache lines may be managed as a set of groups of cache lines for higher cache processing performance. For instance, a group of cache lines may be bundled, and a number may be assigned to each bundle or bucket. Logging of trace data may be done based on a unit or a bucket of cache lines.

In embodiments, a processor configured according to the embodiments described herein can automatically enable and/or disable tracing when switching execution contexts. Examples of context switches include context switches between user mode and kernel mode, context switches between threads (e.g., from one TID/TSID to another TID/TSID), context switches between processes (e.g., from on PID/PSID to another PID/PSID), context switches between virtual processes (e.g., from one virtual PID/PSI to another virtual PID/PSID), context switches between virtual machines (e.g., from VMID to another VMID), context switches between virtual processors (e.g., from on VPID to another VPID), etc.

In embodiments, trace logging is automatically enabled or disabled based on switching between one context that is being traced, and another context that is not being traced. For example, embodiments might automatically disable tracing when switching from a first TID/TSID corresponding to a first thread whose execution is being traced to a second TID/TSID corresponding to a second thread whose execution is not being traced; later, embodiments might automatically enable tracing when switching back from the second TID/TSID to the first TID/TSID. As another example, embodiments might automatically enable tracing when switching from a first VMID corresponding to a first virtual machine whose execution is not being traced to a second VMID corresponding to a second virtual machine whose execution is being traced; later, embodiments might automatically disable tracing when switching back from the second VMID to the first VMID.

Additionally, or alternatively, trace logging may automatically be enabled or disabled based on switching between one context that is being traced to a first trace data steam, and another context that is being traced to a different second trace data stream. For instance, when switching from a first VMID that is being traced to a first trace data stream to a second VMID that is being traced to a second trace data stream, embodiments might automatically disable tracing for the first VMID and automatically enable tracing for the second VMID; later, when switching back from the second VMID to the first VMID, embodiments might automatically disable tracing for the second VMID and automatically enable tracing for the first VMID.

In connection with automatically enabling tracing when switching to a context that is being traced, a processor may additionally flush one or more cache entries and/or update cache line logging information so that cache misses can be properly logged during execution of this context. As will be appreciated, if logging based on cache misses were to proceed based on the state of the cache at the time of the context switch, it is possible that the current context could consume a cache line that is already in the cache and thus the trace data for the context might lack a record of this consumption (i.e., since there would be no cache miss for that access, and thus no logging of that cache line). For instance, the current context might be a first traced thread that accesses a cache line that was placed in the cache due to prior execution of a related non-traced thread from the same process. As such, in embodiments, when automatically enabling tracing, the processor might flush the cache, or a portion thereof, in order to ensure that the current context causes cache misses, which can then be logged. Additionally, or alternatively, the processor update cache line logging tracking information to ensure correct logging.

As will be appreciated, flushing the cache each time logging is enabled at a context switch could be inefficient. For instance, it can take a considerable number of clock cycles to flush a cache. In addition, flushing the cache on each context transition to a traced context would likely result in repeated cache misses for the same cache line data and thus in duplicated trace data. For example, if a particular cache line was logged during a prior logged execution of a particular thread, flushing the cache when switching back to this thread from another thread would result in re-logging that cache line if the thread accesses the same cache line again. Accordingly, some embodiments apply one or more logging tracking mechanisms to mitigate or eliminate cache flushing when enabling logging.

For example, FIG. 5 illustrated a flag 510 that indicates whether or not a given cache line has been logged. In an example, the processor may set this flag (e.g., to one) on cache lines that have been logged during execution of a logging context. Then, after switching from another context back to the logging context, the processor may only need to clear (e.g., to zero) these bits instead of flushing the cache. Alternatively, the processor could flush only the cache lines that are marked a logged. If the logging context again consumes a cache line when a tracking bit is cleared, the cache line can be logged (e.g., as if it was a cache miss) and the bit can be set. As an alternative, the processor might only clear a cache line flag bit when a non-logging context modifies the cache line. Thus, any cache lines previously logged by the logging context, and which were not modified by the non-logging context, need not be re-logged. Some embodiments might extend these flag bits to include a plurality of bits which can be used to indicate, for example, which processor core(s) (and thus which execution context(s)) have logged a cache line, thus enabling logging data for a given cache line to be tracked for multiple contexts. Again, these pluralities of bits can be updated, as needed when logging is being enabled at a context switch to avoid cache flushes and/or re-logging cache lines for a current logged context.

Other embodiments might additionally, or alternatively, use way-locking in a set-associative cache to track which cache lines have been logged. For instance, one or more cache ways might be devoted for exclusive use for a given logged execution context, such that these cache lines are unaffected when other context(s) are executing. Thus, when enabling logging when switching back to the logged context, a cache flush might be avoided since no other contexts would have affected the logged cache lines for the current context.

Embodiments may also preserve logging integrity when switching between two (or more) logging contexts. In embodiments, these logging contexts could be logged into the same trace data stream, potentially while inserting data indicating when a context switch happened. This embodiment avoids cache flushes and duplicative logging caused by context switches, but makes trace data for each context dependent on the trace data for the other context(s). However, it may not be practical or desirable to trace different contexts into the same trace data stream (e.g., due to security considerations).

Thus, other embodiments enable these logging contexts to be logged into different trace data streams, while flushing cache lines and/or update tracking information to ensure correctness and completeness of each trace data stream. For instance, one technique might treat the tracking information in much the same way as if the context being switched from was not being logged—i.e., flush cache lines, clear tracking bits, etc. as described above. This might cause some re-logging, but can be used to record independent trace data streams. Another embodiment might leverage processor extensions (e.g., VMX by INTEL) that tag cache lines with information (e.g., VMID, PID/PSID, etc.) identifying the context to which the cache line applies. When a current context access an existing cache line, this tagging information can be used to determine if the cache line applies to another context, and if so, log the cache line.

At times, there may be outstanding non-logged trace data at the time of a transition from logging to non-logging. Some embodiments may flush the tracing buffers (and this non-logged trace data) in connection with this transition. Other embodiments might continue to write this non-logged trace data in the background after the transition, as processor resources are available. These embodiments might involve the processor tracking state (e.g., via TLB entries) identifying what data still needs to be written to the trace. When evicting a cache line (or other loggable entity), this state might also be consulted, so that the cache line (or other loggable entity) can be logged prior to the eviction. In embodiments, if there is a later transition from non-logging back to logging while there is still outstanding non-logged trace data, the processor might flush this outstanding trace data, or might stall the new logged context (while potentially enabling non-logged contexts to continue executing) in order to write the outstanding trace data prior to executing the new logged context.

As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
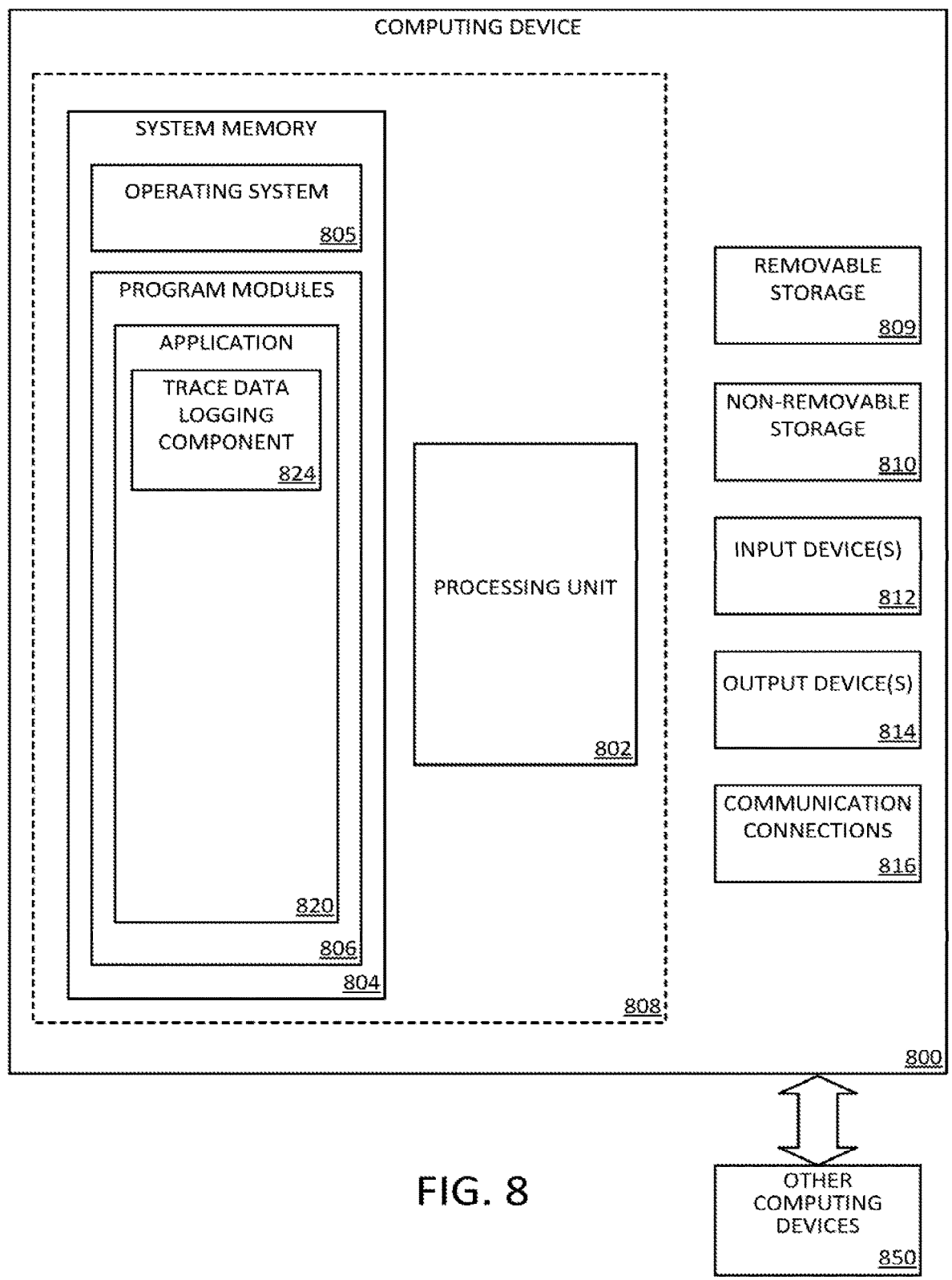
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as a trace data logging component 824. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which may be used to store information and which may be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
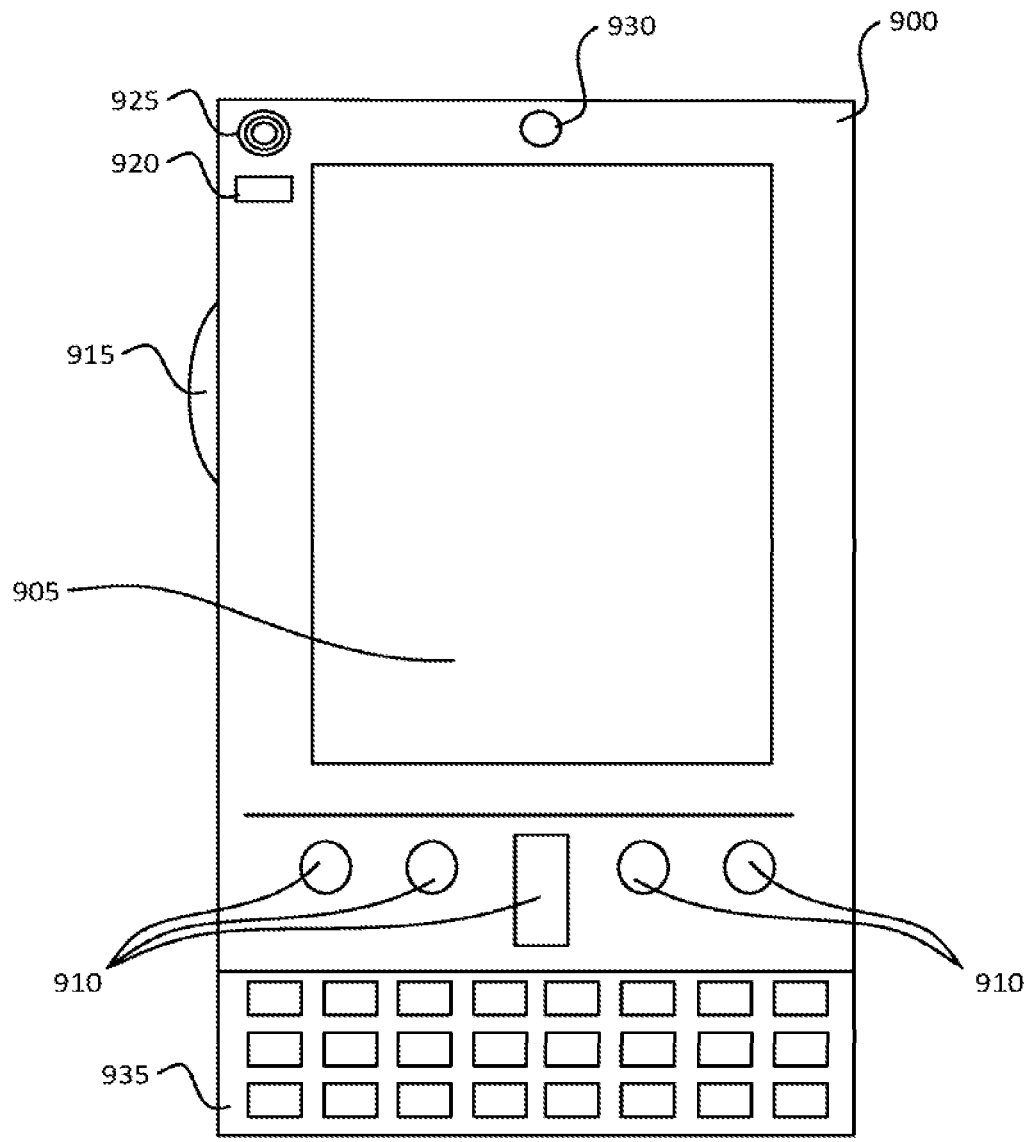
FIGS. 9A and 9B are simplified block diagrams of a mobile computing device with which aspects of the present disclosure may be practiced.
Figure 9B:
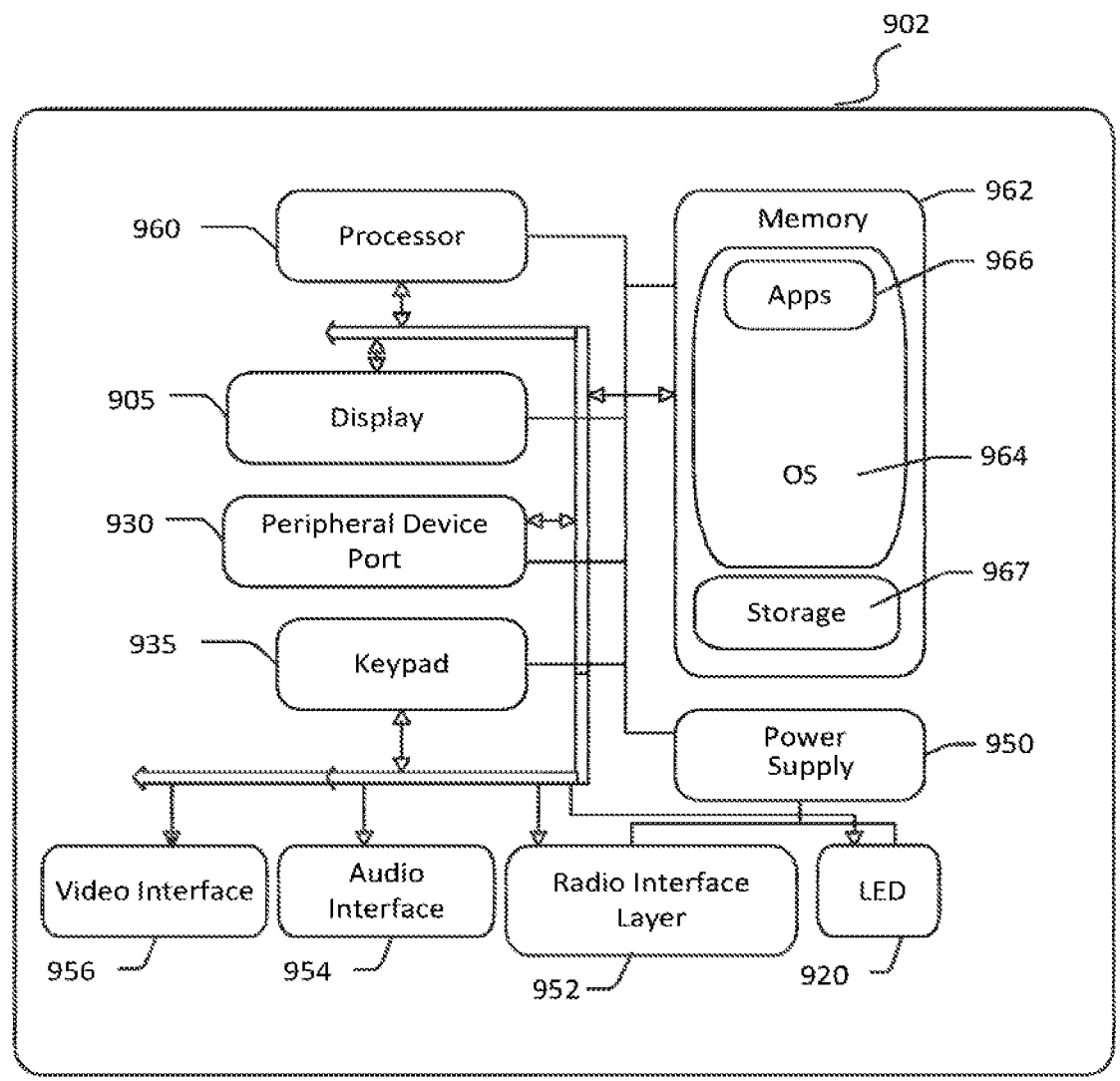

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
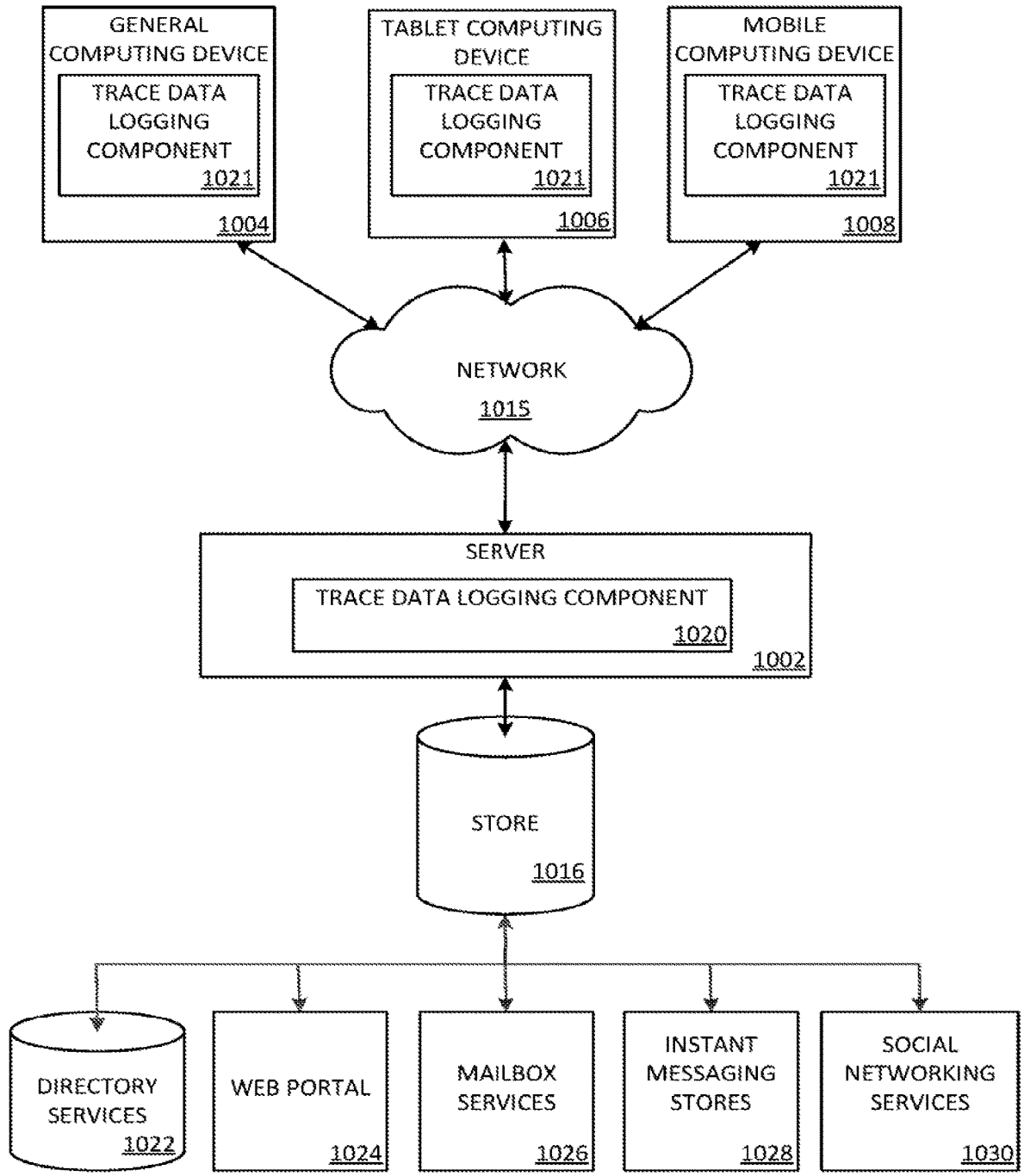
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Trace data logging component 1021 may be employed by a client that communicates with server device 1002, and/or trace data logging component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
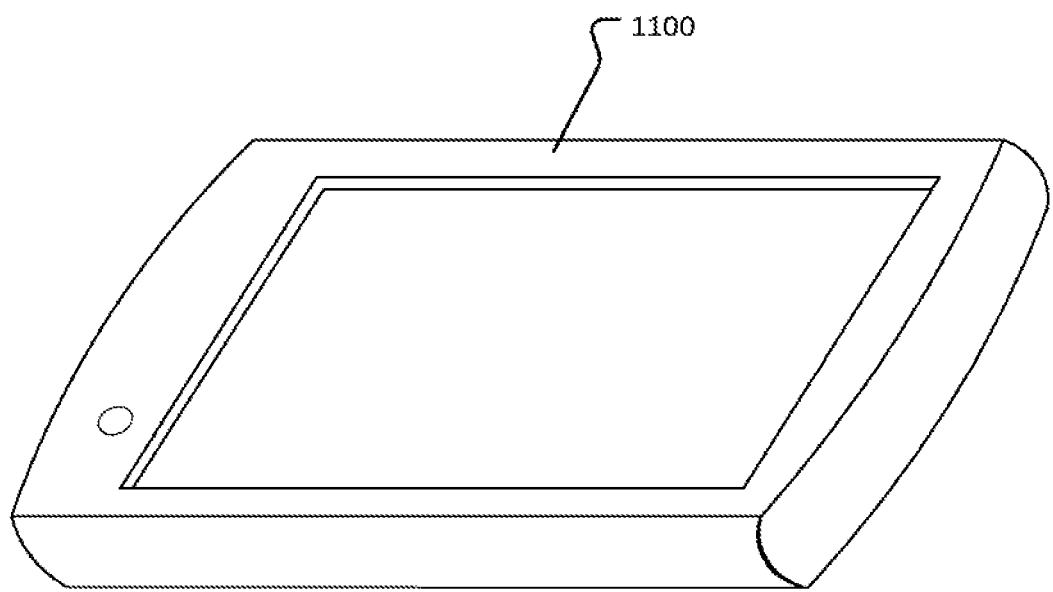
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer device, comprising:
   one or more processing units; and
   at least one memory storing computer-executable instructions for logging processor trace data generated by executing program code at an instruction level, the computer-executable instructions when executed by the one or more processing units causing the computer device to:
      receive outstanding processor trace data to be logged and that is associated with a particular execution context, the outstanding processor trace data comprising information about one or more cache lines retrieved by a processing unit of the one or more processing units when executing the particular execution context;
      compare an amount of the outstanding processor trace data to be logged with at least one threshold; and
      based on the amount of the outstanding processor trace data to be logged exceeding the at least one threshold, selectively process processor trace data, comprising slowing a rate of generating the processor trace data by slowing processor speed of the processing unit executing the particular execution context.

2. The computer device of claim 1, wherein selectively processing processor trace data also comprises selectively delaying logging of at least some of the outstanding processor trace data, the selectively delaying logging of at least some of the outstanding processor trace data further comprising:
  identifying an indication to access at least one cache line as READ access;
  marking a portion of processor trace data associated with the at least one cache line; and
  delaying logging of the portion of processor trace data associated with the at least one cache line.

3. The computer device of claim 2, wherein marking the portion of processor trace data comprises identifying the portion of processor trace data as non-urgent.

4. The computer device of claim 2, wherein content of the at least one cache line is coherent with content in corresponding memory.

5. The computer device of claim 1, wherein the at least one threshold comprises a first threshold corresponding to the rate of generating the processor trace data and a second threshold corresponds to a number of cache lines associated with the outstanding processor trace data.

6. The computer device of claim 1, wherein the particular execution context is identified by at least one of a thread identifier, a process identifier, a virtual process identifier, a virtual machine identifier, or a virtual processor identifier.

7. The computer device of claim 1, the computer-executable instructions when executed by the one or more processing units also causing the computer device to restore processor speed when executing within one or more other execution contexts.

8. The computer device of claim 1, wherein the outstanding processor trace data comprises information selected from a list consisting of:
  data values on a cache line;
  data values on one or more registers;
  one or more address values associated with the cache line;
  one or more address values associated with the one or more registers;
  one or more address values associated with program instruction code; and
  a start time of executing the program instruction code.

9. The computer device of claim 1, wherein selectively processing processor trace data also comprises suspending logging of the processor trace data for a period of time.

10. The computer device of claim 1, the computer-executable instructions when executed by the one or more processing units also causing the computer device to automatically enable tracing when switching to a logging context.

11. The computer device of claim 1, the computer-executable instructions when executed by the one or more processing units also causing the computer device to automatically disable tracing when switching to a non-logging context.

12. A method, implemented at a computer device that includes one or more processing units, for logging processor trace data generated by executing program code at an instruction level, the method comprising:
  receiving outstanding processor trace data to be logged and that is associated with a particular execution context, the outstanding processor trace data comprising information about one or more cache lines retrieved by a processing unit of the one or more processing units when executing the particular execution context;
  comparing an amount of the outstanding processor trace data to be logged with at least one threshold; and
  based on the amount of the outstanding processor trace data to be logged exceeding the at least one threshold, selectively processing processor trace data, comprising slowing a rate of generating the processor trace data by slowing processor speed of the processing unit executing the particular execution context.

13. The method of claim 12, wherein selectively processing processor trace data also comprises selectively delaying logging of at least some of the outstanding processor trace data.

14. The method of claim 12, wherein selectively processing processor trace data also comprises suspending logging of the processor trace data for a period of time.

15. The method of claim 12, wherein the particular execution context is identified by at least one of a thread identifier, a process identifier, a virtual process identifier, a virtual machine identifier, or a virtual processor identifier.

16. The method of claim 12, further comprising automatically enabling tracing when switching to a logging context and automatically disabling tracing when switching to a non-logging context.

17. A hardware storage device storing computer-executable instructions for logging processor trace data generated by executing program code at an instruction level, the computer-executable instructions when executed by one or more processing units causing a computer device to:
  receive outstanding processor trace data to be logged and that is associated with a particular execution context, the outstanding processor trace data comprising information about one or more cache lines retrieved by a processing unit of the one or more processing units when executing the particular execution context;
  compare an amount of the outstanding processor trace data to be logged with at least one threshold; and
  based on the amount of the outstanding processor trace data to be logged exceeding the at least one threshold, selectively process processor trace data, comprising slowing a rate of generating the processor trace data by slowing processor speed of the processing unit executing the particular execution context.

* * * * *